United States Patent [19]
Ito et al.

[11] Patent Number: 6,124,057
[45] Date of Patent: Sep. 26, 2000

[54] NON-AQUEOUS ELECTROLYTE SECONDARY BATTERY

[75] Inventors: Shuji Ito, Akashi; Toshihide Murata, Izumiotsu; Yasuhiko Bito, Minamikawachi-gun; Yoshinori Toyoguchi, Yao, all of Japan

[73] Assignee: Matsushita Electric Industrial Co., Ltd., Osaka-fu, Japan

[21] Appl. No.: 08/993,735

[22] Filed: Dec. 18, 1997

[30] Foreign Application Priority Data

Dec. 20, 1996 [JP] Japan ................................. 8-341012
Mar. 10, 1997 [JP] Japan ................................. 9-054947
Jun. 4, 1997 [JP] Japan ................................. 9-163285

[51] Int. Cl.[7] ............................................ H01M 4/60
[52] U.S. Cl. ........................ 429/213; 429/226; 429/227; 429/228; 429/229; 429/231.1; 429/231.2; 429/231.3; 429/231.5; 429/231.95
[58] Field of Search ..................... 429/226, 227, 429/228, 229, 231.1, 231.2, 231.3, 231.5, 231.95, 218

[56] References Cited

U.S. PATENT DOCUMENTS 4,913,988  4/1990  Langan .
5,284,721  2/1994  Beard ..................................... 429/194
5,474,861 12/1995  Bito et al. .
5,595,841  1/1997  Suzuki ................................... 429/217
5,618,640  4/1997  Idota et al. ............................. 429/194

FOREIGN PATENT DOCUMENTS 0 413 331 A2  2/1991  European Pat. Off. .
0 582 410 A1  2/1994  European Pat. Off. .
    05251080  9/1993  Japan .
    06044959  2/1994  Japan .
    06243870  9/1994  Japan .
  09245787A2  9/1997  Japan ............................. H01M 4/58

Primary Examiner—Maria Nuzzolillo
Assistant Examiner—Angela J. Martin
Attorney, Agent, or Firm—Akin, Gump, Strauss, Hauer & Feld, L.L.P.

[57] ABSTRACT

The present invention provides a non-aqueous electrolyte secondary battery having an anode active material with a high capacity and excellent cycle characteristics. The active material comprises a salt of a metal or a semi-metal and a compound selected from the group consisting of oxo-acids, thiocyanic acid, cyanogen, and cyanic acid, wherein each said oxo-acid comprises an element selected from the group consisting of nitrogen, sulfur, carbon, boron, phosphorus, selenium, tellurium, tungsten, molybdenum, titanium, chromium, zirconium, niobium, tantalum, manganese, and vanadium, salts of said oxo-acids of phosphorus and boron being restricted to hydrogenphosphates and hydrogenborates.

14 Claims, 2 Drawing Sheets

NON-AQUEOUS ELECTROLYTE SECONDARY BATTERY

BACKGROUND OF THE INVENTION

The present invention relates to an improvement in anodes of non-aqueous electrolyte secondary batteries.

Non-aqueous electrolyte secondary batteries including lithium or a lithium compound for the anode are expected to have a high voltage and high energy density, and therefore, they are extensively studied.

Known cathode active materials for the non-aqueous electrolyte secondary batteries are oxides and chalcogens of transition metals, such as $LiMn_2O_4$, $LiCoO_2$, $LiNiO_2$, $V_2O_5$, $Cr_2O_5$, $MnO_2$, $TiS_2$, $MoS_2$ and the like. These compounds have a layered or tunneled crystal structure to allow lithium ions to freely intercalate and deintercalate. The use of metallic lithium for the anode active material has intensively been examined. Such use, however, has a drawback; lithium dendrite occurring on the surface of metallic lithium in the course of charging results in lowering the charge-discharge efficiency and may come into contact with the cathode to cause an inner short circuit.

In order to solve this problem, the potentials for application of lithium alloys, such as lithium-aluminum, which can depress the growth of lithium dendrite and absorb and desorb lithium, for the anode have been studied. However, when lithium alloys are used for the anode, repeated charge and discharge causes pulverization of the alloys, posing a problem of poor cycle life characteristics.

There are proposals for solving this problem by inhibiting pulverization of the alloys by including additional elements in the lithium-aluminum alloy (for example, Japanese Laid-Open Patent Publication Sho 62-119856 and Hei 4-109562), although the improvement is not sufficient. Lithium ion batteries recently developed have anodes composed of carbon material that reversibly intercalates and deintercalates lithium and has excellent cycle characteristics and safety though having a smaller capacity than those of the anode active materials mentioned above.

With a view to enhancing the capacity, a number of studies have proposed application of oxides for the anode; for example, crystalline oxides, such as SnO and $SnO_2$ (Japanese Laid-Open Patent Publication Hei 7-122274 and Hei 7-235293) and amorphous oxides, such as $SnSiO_3$, $SnSi_{1-x}P_xO_3$ (Japanese Laid-Open Patent Publication Hei 7-288123). These oxides, however, do not sufficiently improve the characteristics.

SUMMARY OF THE INVENTION

The object of the present invention is thus to provide an anode for non-aqueous electrolyte secondary batteries having excellent charge-discharge cycle characteristics.

The present invention provides an anode that absorbs lithium in the course of charging not to cause dendrite and has a large electric capacity and an excellent cycle life.

The present invention is directed to a non-aqueous electrolyte secondary battery comprising a cathode capable of being charged and discharged, a non-aqueous electrolyte, and an anode capable of being charged and discharged, the anode having an active material that comprises a salt of a metal or a semi-metal and a compound selected from the group consisting of an oxo-acid, thiocyanic acid, cyanogen, and cyanic acid, wherein the oxo-acid is one of an element selected from the group consisting of nitrogen, sulfur, carbon, boron, phosphorus, selenium, tellurium, tungsten, molybdenum, titanium, chromium, zirconium, niobium, tantalum, manganese, and vanadium.

It is preferable that the metal or the semi-metal constituting the metal salt or the semi-metal salt is at least one selected from the group consisting of Al, Sn, Si, Pb, Cd, Bi, In, Zn, Mg, Ge, Ga, Ca, Ba, Ir, Sb, Ti, V, Cr, Mn, Fe, Co, Ni, Cu, Mo, W, and Nb. Especially preferable are Sn, Pb, In, and Bi.

The present invention gives a non-aqueous electrolyte secondary battery that is free from a short circuit due to dendrite and has a high energy density, an excellent cycle life, and a high reliability.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
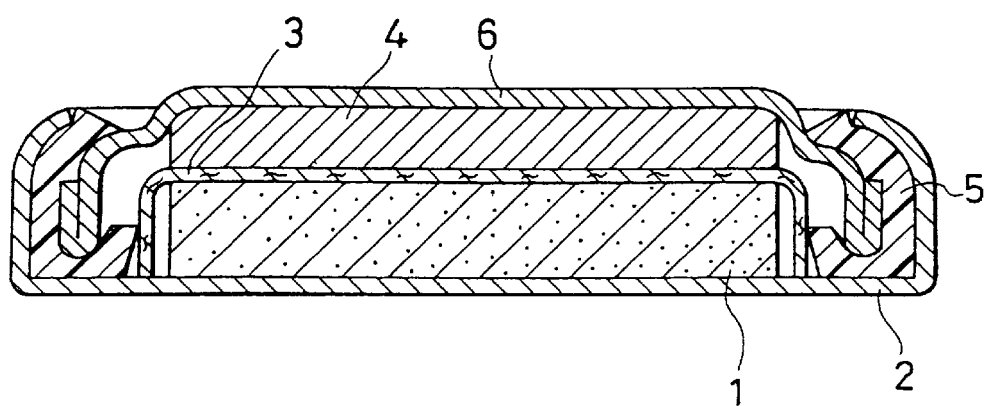
FIG. 1 is a vertical sectional view schematically illustrating a test cell used for evaluating the electrode characteristics of active materials in accordance with the present invention.

As discussed above, the anode of the present invention comprises a metal salt or a semi-metal salt of a specific acid or cyanogen.

In the following description, salts of a divalent metal $M^{II}$ are given as examples. Salts of nitrogen oxo-acids include nitrates $M^{II}(NO_3)_2$ and nitrites $M^{II}(NO_2)_2$.

Salts of sulfur oxo-acids include sulfates $M^{II}SO_4$, sulfites $M^{II}SO_3$, disulfates $M^{II}S_2O_7$, peroxomonosulfates $M^{II}SO_5$, peroxodisulfates $M^{II}S_2O_8$, thiosulfates $M^{II}S_2O_3$, disulfites $M^{II}S_2O_5$, thiosulfites $M^{II}S_2O_2$, hydrogensulfates such as $M^{II}(HSO_4)_2$, thionates such as dithionates $M^{II}S_2O_6$ and dithionites $M^{II}S_2O_4$, sulfoxylates such as $M^{II}SO_2$, and hydrogen-containing acid salts.

Preferable salts of phosphorus oxo-acids include hydrogenphosphates such as $M^{II}HPO_4$ and $M^{II}(H_2PO_4)_2$, phosphinates $M^{II}(PH_2O_2)_2$, and phosphonates $M^{II}PHO_3$.

Salts of carbon oxo-acids include carbonates $M^{II}CO_3$ and hydrogencarbonates $M^{II}(HCO_3)_2$.

Preferable salts of boron oxo-acids include hydrogenborates such as $M^{II}(H_2BO_3)_2$ and $M^{II}HBO_3$.

Salts of selenium oxo-acids include selenates $M^{II}SeO_4$, selenites $M^{II}SeO_3$, $M^{II}SeO_5$, hydrogenselenates $M^{II}(HSeO_4)_2$, and hydrogenselenites $M^{II}(HSeO_3)_2$.

Salts of tellurium oxo-acids include tellurates such as $M^{II}_3TeO_6$ and $M_{II}TeO_4$, and hydrogentellurates such as $M^{II}_5(H_5TeO_6)_2$, $M^{II}_2H_2TeO_6$, $M^{II}_3(H_3TeO_6)_2$, and $M^{II}H_4TeO_6$.

Available thiocyanates include $M^{II}(SCN)_2$, while available cyanides and cyanates include $M^{II}(CN)_2$ and $M^{II}(ONC)_2$.

The metal salt and the semi-metal salt of the present invention are, however, not restricted to the above chemical compositions.

Among the above salts, sulfates, hydrogensulfates, carbonates, hydrogenborates, and hydrogenphosphates are preferable for the improvement in cycle characteristics.

The following gives salts of oxo-acids of transition elements W, Mo, Ti, Zr, Nb, Ta, Mn, and V as examples. In the following formulae, $M^{III}$ represents a trivalent metal or semi-metal.

Available tungstates include $M^{II}WO_4$, $M^{II}WO_3$, $M^{III}WO_6$. Available molybdates include $M^{II}MoO_4$ and $M^{III}Mo_4O_6$. Available titanates include $M^{II}TiO_3$, $M^{II}TiO_4$, $(M^{III})_2TiO_5$, and $M^{III}Ti_3O_7$.

Available zirconates include $M^{II}ZrO_3$ and $M^{II}ZrO_4$. Available chromates include $M^{III}CrO_3$, $M^{II}CrO_4$, $M^{II}Cr_2O_4$, and $(M^{III})_2CrO_6$. Available niobates include $M^{III}NbO_4$, $M^{II}Nb_2O_6$, and $(M^{III})_2Nb_2O_7$.

Available tantalates include $M^{III}TaO_4$ and $(M^{II})_2Ta_2O_7$. Available manganates include $M^{II}MnO_3$, $(M^{III})_2MnO_4$, and $(M^{III})_2MnO_6$. Available vanadates include $M^{III}VO_4$, $(M^{III})_2VO_5$, and $M^{II}V_2O_6$.

Preferable are chromates, tungstates, molybdates, vanadates, manganates, and tantalates, and especially preferable are chromates, tungstates, and molybdates for the improvement in cycle characteristics.

The metal salt and the semi-metal salt of the present invention are, however, not restricted to the above chemical compositions.

The present inventors have made an intensive study on the availability of various metal salts and semi-metal salts as the negative electrode material. It was found that such compounds can serve as the negative electrode materials with a high capacity and exceptional cycle life characteristics that have a crystal structure in which the metal or semi-metal is surrounded by a) the salts including oxygen and any one of nitrogen, sulfur, phosphorus, carbon, boron, selenium, and tellurium, such as salts of oxo-acids of nitrogen, sulfur, phosphorus, carbon, boron, selenium and tellurium or by the salts further including hydrogen such as hydrogen-containing oxo-acids; b) cyanides containing nitrogen and carbon; c) cyanates containing nitrogen, carbon and oxygen; or d) thiocyanates containing nitrogen, carbon and sulfur and in which those salts are bonded to the metal or semi-metal by ionic force.

The present inventors also discovered that such compounds can also serve as the negative electrode materials with a high capacity and superb cycle life characteristics that have a crystal structure in which the metal or semi-metal is surrounded by the salts of oxo-acid of a transition element including oxygen and any one of tungsten, molybdenum, titanium, chromium, zirconium, niobium, tantalum, manganese and vanadium, that is, tungstates, molybdates, titanates, zirconates, chromates, niobates, tantalates, manganates and vanadates.

The prior art metal oxides have the greater tendency of covalent bonding and tougher skeletons than those of the metal salts and semi-metal salts in accordance with the present invention. While the prior art metal oxides are presumed to be relatively brittle under the conditions of expansion and contraction accompanied by intercalation and deintercalation of a large amount of lithium, however, the metal salts and semi-metal salts of the present invention are expected to be relatively tough under the conditions of expansion and contraction accompanied by intercalation and deintercalation of a large amount of lithium. It is also found that the existence of hydrogen in the salts of oxo-acids further improves the cycle characteristics, although the details have not yet been elucidated.

The chemical compositions of the metal salts and the semi-metal salts discussed above represent only examples of divalent or trivalent metals and semi-metals. Chemical compositions of metal salts and semi-metal salts of different valences should be apparent to the skilled in the art. For example, selenates can be expressed by the following general formulae as the metal salts and semi-metal salts of the valence m:

$M_2(SeO_4)_m$, $M_2(SeO_3)_m$, $M_2(SeO_5)_m$, $M(HSeO_4)_m$, and $M(HSeO_3)_m$.

Some examples in accordance with the present invention are given below, although the anode material of the present invention is not restricted to the chemical compositions discussed in these examples.

EXAMPLE 1

Test cells shown in FIG. 1 were manufactured and tested for evaluation of the electrode characteristics of various metal and semi-metal nitrates and nitrites specified in Tables 1 and 2 and used as the anode active material.

Referring to FIG. 1, numeral 1 designates a test electrode composed of a molded mixture containing an active material. The test electrode 1 is arranged on the substantial center of a battery casing 2. A separator 3 of a micro-porous polypropylene film was placed on the test electrode 1. After injection of an electrolyte solution, the opening of the battery casing 2 is sealed with a sealing plate 6 having a counter electrode 4 composed of a metallic lithium disc of 17.5 mm in diameter on the inner surface thereof and a polypropylene gasket 5 on the circumference thereof. This completes a test cell.

The mixture included 6 g of an active material powder, 3 g of graphite powder as a conductive agent, and 1 g of polyethylene powder as a binding agent. The test electrode 1 was obtained by press molding 0.1 g of the mixture to a disc of 17.5 mm in diameter. The electrolyte used was prepared by dissolving lithium perchlorate ($LiClO_4$) at a concentration of 1 mol/l in a 1:1 mixed solution (volume ratio) of ethylene carbonate and dimethoxyethane.

At a constant electric current of 2 mA, the test cell was subjected to cathode polarization (which corresponds to charging in case that the active material-containing electrode is considered as the anode) until the electrode potential became 0 V with respect to the lithium counter electrode. The test cell was then subjected to anode polarization (which corresponds to discharging) until the electrode potential became 1.5 V with respect to the counter electrode. After the repeated cathode polarization and anode polarization, and the electrode characteristics were evaluated.

For the purpose of comparison, electrodes were manufactured in the above manner using the known compounds shown in Table 3, that is, crystalline oxides $WO_2$, $Fe_2O_3$, SnO, and PbO, sulfides SnS and PbS, and amorphous metal oxides $SnSiO_3$ and $SnSi_{0.8}P_{0.2}O_{3.1}$, and test cells were assembled and tested under the same conditions for evaluation of the electrode characteristics.

Tables 1 through 3 show the discharge capacities per one gram of the active material in the first cycle.

The measurement proved that all the test cells of Example 1 were capable of being charged and discharged. After the conclusion of cathode polarization of these test cells in the tenth cycle, the test cells were decomposed. No deposit of metallic lithium was observed in any of the test cells of Example 1.

The above experiments show that cathode polarization makes lithium absorbed in the electrodes including the active materials of Example 1 and anode polarization makes the absorbed lithium released from the electrodes, thereby causing no deposit of metallic lithium. The electrodes of Example 1 have higher capacities than those of the comparative examples.

Figure 2:
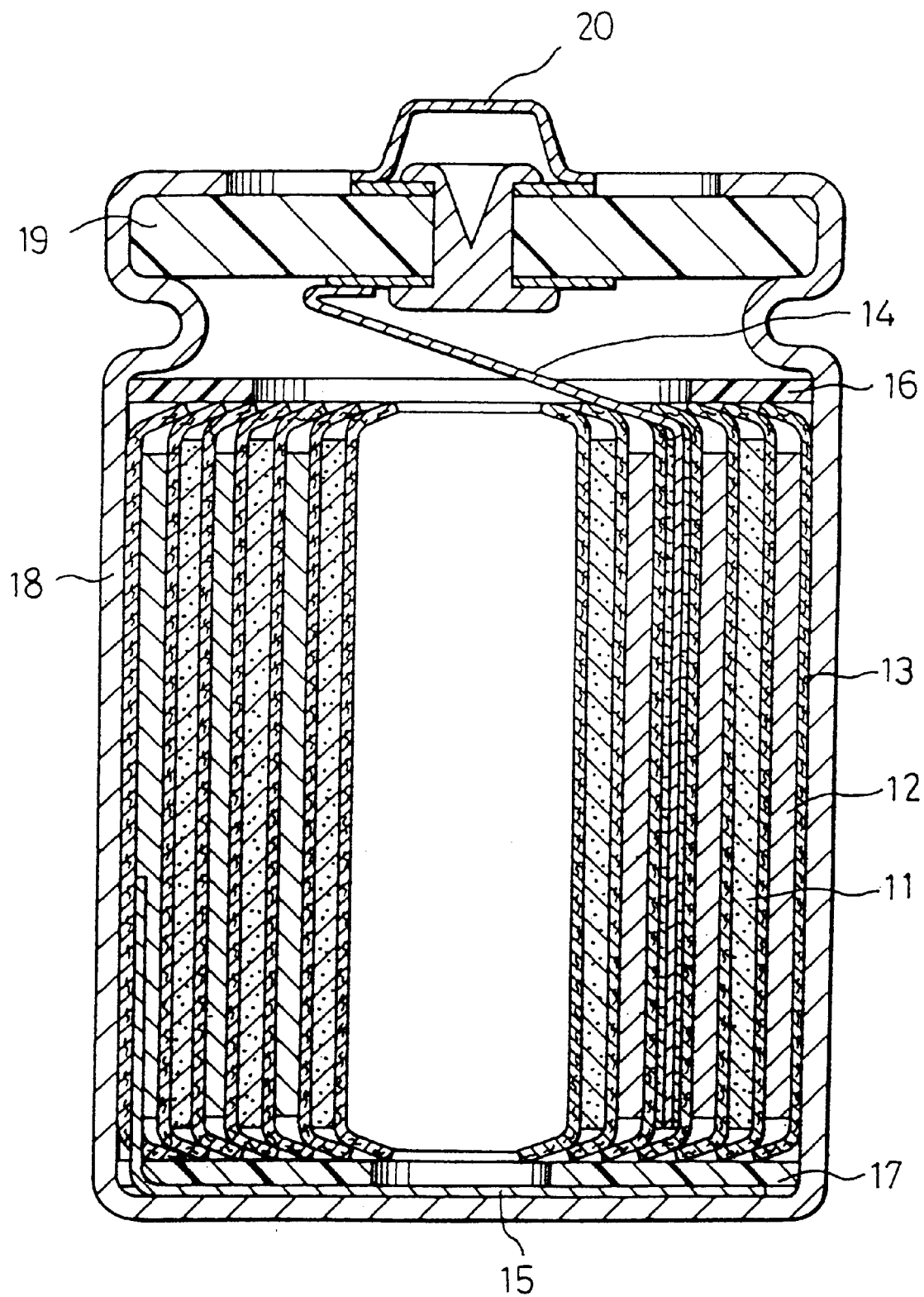
FIG. 2 is a vertical sectional view schematically illustrating a cylindrical battery including an anode in accordance with the present invention.

Cylindrical batteries shown in FIG. 2 were manufactured and tested for evaluation of the cycle characteristics of the batteries using various metal and semi-metal nitrates and nitrites of Example 1.

Each battery was manufactured in the following manner.

A cathode active material $LiMn_{1.8}Co_{0.2}O_4$ was prepared by mixing $Li_2CO_3$, $Mn_3O_4$, and $CoCO_3$ at a predetermined molar ratio, heating the mixture at 900° C., and classifying the mixture to or below 100 meshes.

A paste was prepared by mixing 100 g of the cathode active material, 10 g of carbon powder as a conductive agent, and 8 g (as the resin) of aqueous dispersion of polyethylene tetrafluoride as a binding agent, and pure water. The paste was applied onto a titanium core member, dried, and rolled out to a cathode plate.

An anode plate was manufactured by mixing a metal or semi-metal nitrate or nitrite as an active material, graphite powder as a conductive agent, and Teflon powder as a binding agent at the weight ratio of 60:30:10, adding a petroleum solvent to the mixture to yield a paste, applying the paste onto a copper core member, and drying it at 100° C. A micro-porous polypropylene film was used as a separator.

A cathode plate 11 with a cathode lead 14 which is composed of the same material as that of the core member and attached to the cathode plate 11 by spot welding, an anode plate 12 with an anode lead 15 welded thereto, and a separator 13 having a greater width than those of these electrode plates 11 and 12 were wound in spirals to constitute an electrode group. Polypropylene insulating plates 16 and 17 were placed on the top and bottom of the electrode group, and the assembly was inserted into a battery casing 18. After formation of a step on the upper portion of the battery casing 18 and injection of the same non-aqueous electrolyte as that of the above-mentioned test cell, the battery casing 18 was sealed with a sealing plate 19 having an anode terminal 20. This completes a battery.

The batteries constructed as above were subjected to a charge-discharge cycle test at a temperature of 30° C. and a charge-discharge current of 1 mA/cm$^2$ in a charge-discharge voltage range of 4.3 V to 2.6 V. A rate of the discharge capacity at the 100-th cycle to the discharge capacity at the second cycle (hereinafter referred to as capacity maintenance rate) was measured.

Anode plates were prepared and test batteries were assembled in the above manner for the comparative examples. The cycle characteristics of the comparative examples were also evaluated under the same conditions.

Tables 1 through 3 show the results of evaluation.

TABLE 1

| Salt | Discharge capacity (mAh/g) | Capacity maintenance rate (%) |
|---|---|---|
| $Al(NO_3)_3$ | 284 | 75 |
| $Al(NO_2)_3$ | 326 | 73 |
| $Sn(NO_3)_4$ | 346 | 86 |
| $Sn(NO_2)_4$ | 389 | 84 |
| $Sn(NO_3)_2$ | 485 | 84 |

TABLE 1-continued

| Salt | Discharge capacity (mAh/g) | Capacity maintenance rate (%) |
|---|---|---|
| $Sn(NO_2)_2$ | 510 | 82 |
| $Si(NO_3)_4$ | 390 | 83 |
| $Si(NO_2)_4$ | 435 | 84 |
| $Pb(NO_3)_2$ | 356 | 83 |
| $Pb(NO_2)_2$ | 394 | 82 |
| $Cd(NO_3)_2$ | 320 | 78 |
| $Cd(NO_2)_2$ | 336 | 77 |
| $Bi(NO_3)_3$ | 298 | 78 |
| $Bi(NO_2)_3$ | 324 | 75 |
| $In(NO_3)_3$ | 346 | 78 |
| $In(NO_2)_3$ | 375 | 75 |
| $Zn(NO_3)_2$ | 289 | 75 |
| $Zn(NO_2)_2$ | 326 | 79 |
| $Ga(NO_3)_3$ | 335 | 75 |
| $Ga(NO_2)_3$ | 362 | 72 |
| $Ge(NO_3)_4$ | 367 | 74 |
| $Ge(NO_2)_4$ | 400 | 72 |
| $Mg(NO_3)_2$ | 296 | 81 |
| $Mg(NO_2)_2$ | 334 | 79 |
| $Sb(NO_3)_3$ | 425 | 75 |
| $Sb(NO_2)_3$ | 433 | 73 |
| $Ti(NO_3)_4$ | 275 | 80 |
| $V(NO_3)_2$ | 255 | 84 |
| $Cr(NO_2)_3$ | 285 | 82 |
| $Mn(NO_3)_2$ | 263 | 83 |
| $Fe(NO_3)_2$ | 274 | 81 |
| $Co(NO_3)_2$ | 269 | 80 |
| $Ni(NO_3)_2$ | 271 | 80 |
| $Cu(NO_3)_2$ | 265 | 78 |
| $Mo(NO_3)_2$ | 222 | 77 |
| $W(NO_3)_4$ | 215 | 80 |
| $Nb(NO_3)_3$ | 220 | 79 |
| $Ca(NO_3)_2$ | 286 | 79 |
| $Ba(NO_3)_2$ | 275 | 80 |
| $Ir(NO_3)_3$ | 266 | 81 |
| $Sr(NO_3)_2$ | 286 | 79 |

TABLE 2

| Salt | Discharge capacity (mAh/g) | Capacity maintenance rate (%) |
|---|---|---|
| $Ba_{0.33}Sn_{0.67}(NO_3)_2$ | 425 | 86 |
| $Ca_{0.33}Sn_{0.67}(NO_3)_2$ | 433 | 85 |
| $Sr_{0.33}Sn_{0.67}(NO_3)_2$ | 443 | 85 |
| $Mg_{0.33}Sn_{0.67}(NO_3)_2$ | 435 | 85 |
| $Mn_{0.22}Sn_{0.78}(NO_3)_2$ | 410 | 86 |
| $Fe_{0.12}Sn_{0.88}(NO_3)_2$ | 451 | 85 |
| $Co_{0.18}Sn_{0.82}(NO_3)_2$ | 444 | 87 |
| $Cu_{0.18}Sn_{0.82}(NO_3)_2$ | 435 | 86 |
| $Ti_{0.12}Sn_{0.82}(NO_3)_2$ | 436 | 85 |
| $Zn_{0.12}Sn_{0.88}(NO_3)_2$ | 442 | 87 |
| $Cr_{0.12}Sn_{0.82}(NO_3)_2$ | 440 | 86 |
| $V_{0.12}Sn_{0.82}(NO_3)_2$ | 421 | 87 |
| $Ba_{0.33}Pb_{0.67}(NO_3)_2$ | 312 | 85 |
| $Ca_{0.33}Pb_{0.67}(NO_3)_2$ | 319 | 87 |
| $Sr_{0.33}Pb_{0.67}(NO_3)_2$ | 329 | 87 |
| $Mg_{0.33}Pb_{0.67}(NO_3)_2$ | 326 | 85 |
| $Mn_{0.22}Pb_{0.78}(NO_3)_2$ | 333 | 84 |
| $Fe_{0.12}Pb_{0.88}(NO_3)_2$ | 329 | 86 |
| $Co_{0.18}Pb_{0.82}(NO_3)_2$ | 326 | 85 |
| $Cu_{0.18}Pb_{0.82}(NO_3)_2$ | 319 | 87 |
| $Ti_{0.12}Pb_{0.82}(NO_3)_2$ | 314 | 81 |
| $Zn_{0.12}Pb_{0.88}(NO_3)_2$ | 329 | 83 |
| $Cr_{0.12}Pb_{0.82}(NO_3)_2$ | 320 | 84 |
| $W_{0.09}Pb_{0.82}(NO_3)_2$ | 301 | 87 |
| $Fe_{0.18}In_{0.88}(NO_3)_3$ | 324 | 82 |
| $Co_{0.27}In_{0.82}(NO_3)_3$ | 315 | 83 |
| $Cu_{0.27}In_{0.82}(NO_3)_3$ | 310 | 84 |

TABLE 2-continued

| Salt | Discharge capacity (mAh/g) | Capacity maintenance rate (%) |
|---|---|---|
| $Ti_{0.27}Bi_{0.82}(NO_3)_3$ | 275 | 80 |
| $Zn_{0.27}Bi_{0.88}(NO_3)_3$ | 284 | 79 |

TABLE 3

| Salt | Discharge capacity (mAh/g) | Capacity maintenance rate (%) |
|---|---|---|
| $WO_2$ | 190 | 9 |
| $Fe_2O_3$ | 185 | 10 |
| SnO | 522 | 5 |
| $SnSiO_3$ | 453 | 20 |
| PbO | 453 | 2 |
| SnS | 498 | 6 |
| PbS | 436 | 3 |
| $SnSi_{0.8}P_{0.2}O_{3.1}$ | 406 | 25 |

The batteries using the metal or semi-metal nitrate or nitrite of Example 1 as the anode active material have the improved cycle characteristics, compared with the prior art metal oxides.

EXAMPLE 2

Test cells discussed in Example 1 were manufactured and tested under the same conditions as those of Example 1 for evaluation of the electrode characteristics of various metal and semi-metal carbonates and hydrogencarbonates specified in Tables 4 and 5 and used as the anode active material. Tables 4 and 5 show the discharge capacities of the test cells in the first cycle.

The measurement proved that all the test cells of Example 2 were capable of being charged and discharged.

After the conclusion of cathode polarization of these test cells in the tenth cycle, the test cells were decomposed. No deposit of metallic lithium was observed in any of the test cells of Example 2.

The above experiments show that cathode polarization makes lithium absorbed in the electrodes comprising the active materials of Example 2 and anode polarization makes the absorbed lithium released from the electrodes, thereby causing no deposit of metallic lithium.

Cylindrical batteries discussed in Example 1 were manufactured and tested under the same conditions of those of Example 1 for evaluation of the cycle characteristics of the batteries using various metal and semi-metal carbonates and hydrogencarbonates of Example 2. Tables 4 and 5 show the capacity maintenance rates at the 100-th cycle.

TABLE 4

| Salt | Discharge capacity (mAh/g) | Capacity maintenance rate (%) |
|---|---|---|
| $Al_2(CO_3)_3$ | 342 | 75 |
| $Al(HCO_3)_3$ | 306 | 86 |
| $Sn(CO_3)_2$ | 493 | 86 |
| $SnCO_3$ | 534 | 82 |
| $Sn(HCO_3)_4$ | 424 | 92 |
| $Sn(HCO_3)_2$ | 490 | 90 |
| $Si(CO_3)_2$ | 378 | 81 |

TABLE 4-continued

| Salt | Discharge capacity (mAh/g) | Capacity maintenance rate (%) |
|---|---|---|
| $Si(HCO_3)_4$ | 365 | 89 |
| $PbCO_3$ | 441 | 82 |
| $Pb(HCO_3)_2$ | 402 | 84 |
| $CdCO_3$ | 397 | 75 |
| $Cd(HCO_3)_2$ | 365 | 85 |
| $Bi_2(CO_3)_3$ | 369 | 73 |
| $Bi(HCO_3)_3$ | 305 | 78 |
| $In_2(CO_3)_3$ | 461 | 76 |
| $In(HCO_3)_3$ | 386 | 85 |
| $ZnCO_3$ | 298 | 72 |
| $Zn(HCO_3)_2$ | 268 | 82 |
| $Ga_2(CO_3)_3$ | 334 | 73 |
| $Sb(HCO_3)_3$ | 315 | 75 |
| $Ga(HCO_3)_3$ | 312 | 79 |
| $Ge(CO_3)_2$ | 365 | 75 |
| $Ge(HCO_3)_4$ | 335 | 83 |
| $MgCO_3$ | 304 | 79 |
| $Mg(HCO_3)_2$ | 292 | 85 |
| $Ti_2(CO_3)_3$ | 298 | 75 |
| $MnCO_3$ | 263 | 86 |
| $VCO_3$ | 198 | 86 |
| $Cr_2(CO_3)_3$ | 263 | 82 |
| $FeCO_3$ | 246 | 84 |
| $CoCO_3$ | 259 | 83 |
| $NiCO_3$ | 264 | 81 |
| $CuCO_3$ | 253 | 82 |
| $MoCO_3$ | 221 | 82 |
| $BaCO_3$ | 256 | 80 |
| $CaCO_3$ | 263 | 75 |
| $W(CO_3)_2$ | 215 | 75 |
| $Ir_2(CO_3)_3$ | 321 | 73 |
| $Sb_2(CO_3)_3$ | 365 | 78 |
| $Nb(CO_3)_5$ | 187 | 80 |
| $SrCO_3$ | 273 | 75 |

TABLE 5

| Salt | Discharge capacity (mAh/g) | Capacity maintenance rate (%) |
|---|---|---|
| $Ba_{0.2}Sn_{0.8}CO_3$ | 498 | 84 |
| $Ca_{0.2}Sn_{0.8}CO_3$ | 485 | 85 |
| $Sr_{0.2}Sn_{0.8}CO_3$ | 495 | 85 |
| $Mg_{0.2}Sn_{0.8}CO_3$ | 500 | 86 |
| $Mn_{0.2}Sn_{0.8}CO_3$ | 482 | 85 |
| $Fe_{0.2}Sn_{0.8}CO_3$ | 479 | 87 |
| $Co_{0.2}Sn_{0.8}CO_3$ | 486 | 86 |
| $Cu_{0.2}Sn_{0.8}CO_3$ | 493 | 85 |
| $Ti_{0.2}Sn_{0.7}CO_3$ | 475 | 84 |
| $Zn_{0.2}Sn_{0.8}CO_3$ | 482 | 85 |
| $Cr_{0.2}Sn_{0.7}CO_3$ | 473 | 85 |
| $Mo_{0.2}Sn_{0.8}CO_3$ | 459 | 86 |
| $Ba_{0.2}Pb_{0.8}CO_3$ | 421 | 83 |
| $Ca_{0.2}Pb_{0.8}CO_3$ | 416 | 85 |
| $Sr_{0.2}Pb_{0.8}CO_3$ | 416 | 85 |
| $Mg_{0.2}Pb_{0.8}CO_3$ | 422 | 84 |
| $Mn_{0.2}Pb_{0.8}CO_3$ | 418 | 87 |
| $Fe_{0.2}Pb_{0.8}CO_3$ | 409 | 86 |
| $Co_{0.2}Pb_{0.8}CO_3$ | 417 | 85 |
| $Cu_{0.2}Pb_{0.8}CO_3$ | 415 | 84 |
| $Ti_{0.2}Pb_{0.7}CO_3$ | 398 | 85 |
| $Zn_{0.2}Pb_{0.8}CO_3$ | 405 | 86 |
| $Cr_{0.2}Pb_{0.7}CO_3$ | 403 | 85 |
| $Mo_{0.2}Pb_{0.8}CO_3$ | 398 | 87 |
| $(Fe_{0.3}In_{0.8})_2(CO_3)_3$ | 415 | 79 |
| $(Co_{0.3}In_{0.8})_2(CO_3)_3$ | 410 | 80 |
| $(Cu_{0.3}In_{0.8})_2(CO_3)_3$ | 416 | 81 |
| $(Ti_{0.2}Bi_{0.8})_2(CO_3)_3$ | 342 | 78 |
| $(Zn_{0.3}Bi_{0.8})_2(CO_3)_3$ | 331 | 77 |
| $Ba_{0.2}Sn_{0.8}(HCO_3)_2$ | 452 | 92 |
| $Ca_{0.2}Sn_{0.8}(HCO_3)_2$ | 441 | 94 |

TABLE 5-continued

| Salt | Discharge capacity (mAh/g) | Capacity maintenance rate (%) |
|---|---|---|
| $Sr_{0.2}Sn_{0.8}(HCO_3)_2$ | 443 | 94 |
| $Mg_{0.2}Sn_{0.8}(HCO_3)_2$ | 451 | 93 |
| $Mn_{0.2}Sn_{0.8}(HCO_3)_2$ | 443 | 91 |
| $Fe_{0.2}Sn_{0.8}(HCO_3)_2$ | 439 | 92 |
| $Co_{0.2}Sn_{0.8}(HCO_3)_2$ | 441 | 91 |
| $Cu_{0.2}Sn_{0.8}(HCO_3)_2$ | 456 | 92 |
| $Ti_{0.2}Sn_{0.7}(HCO_3)_2$ | 432 | 92 |
| $Zn_{0.2}Sn_{0.8}(HCO_3)_2$ | 440 | 93 |
| $Cr_{0.2}Sn_{0.7}(HCO_3)_2$ | 429 | 94 |
| $Mo_{0.2}Sn_{0.8}(HCO_3)_2$ | 420 | 94 |
| $Ba_{0.2}Pb_{0.8}(HCO_3)_2$ | 384 | 88 |
| $Ca_{0.2}Pb_{0.8}(HCO_3)_2$ | 372 | 89 |
| $Sr_{0.2}Pb_{0.8}(HCO_3)_2$ | 372 | 89 |
| $Mg_{0.2}Pb_{0.8}(HCO_3)_2$ | 382 | 87 |
| $Mn_{0.2}Pb_{0.8}(HCO_3)_2$ | 371 | 90 |
| $Fe_{0.2}Pb_{0.8}(HCO_3)_2$ | 367 | 91 |
| $Co_{0.2}Pb_{0.8}(HCO_3)_2$ | 371 | 90 |
| $Cu_{0.2}Pb_{0.8}(HCO_3)_2$ | 379 | 89 |
| $Ti_{0.2}Pb_{0.7}(HCO_3)_2$ | 352 | 89 |
| $Zn_{0.2}Pb_{0.8}(HCO_3)_2$ | 368 | 90 |
| $Cr_{0.2}Pb_{0.7}(HCO_3)_2$ | 369 | 90 |
| $Mo_{0.2}Pb_{0.8}(HCO_3)_2$ | 357 | 91 |
| $Fe_{0.3}In_{0.8}(HCO_3)_3$ | 365 | 86 |
| $Co_{0.3}In_{0.8}(HCO_3)_3$ | 359 | 88 |
| $Cu_{0.3}In_{0.8}(HCO_3)_3$ | 358 | 87 |
| $Ti_{0.2}Bi_{0.8}(HCO_3)_3$ | 301 | 86 |
| $Zn_{0.3}Bi_{0.8}(HCO_3)_3$ | 286 | 87 |

The batteries using the metal or semi-metal carbonate or hydrogencarbonate of Example 2 as the anode active material have the improved cycle characteristics, compared with the prior art metal oxides. Especially the use of hydrogencarbonates has remarkably improved the cycle characteristics.

EXAMPLE 3

The electrode characteristics of various metal and semi-metal hydrogenborates specified in Tables 6 through 8 and used as the anode active material were evaluated in Example 3.

Test cells discussed in Example 1 were manufactured, and the discharge capacities were measured under the same conditions as those of Example 1. The results of measurement are shown in Tables 6 through 8.

The measurement proved that all the test cells of Example 3 were capable of being charged and discharged.

After the conclusion of cathode polarization of these test cells in the tenth cycle, the test cells were decomposed. No deposit of metallic lithium was observed in any of the test cells of Example 3.

The above experiments show that cathode polarization makes lithium absorbed in the electrodes comprising the active materials of Example 3 and anode polarization makes the absorbed lithium released from the electrodes, thereby causing no deposit of metallic lithium.

Cylindrical batteries discussed in Example 1 were manufactured, and the capacity maintence rates at the 100-th cycle were measured under the same conditions as those of Example 1. The results of measurement are shown in Tables 6 through 8.

TABLE 6

| Salt | Discharge capacity (mAh/g) | Capacity maintenance rate (%) |
|---|---|---|
| $Al_2(HBO_3)_3$ | 305 | 78 |
| $Al(H_2BO_3)_3$ | 294 | 80 |
| $SnHBO_3$ | 532 | 83 |
| $Sn(HBO_3)_2$ | 453 | 85 |
| $Sn(H_2BO_3)_4$ | 405 | 86 |
| $Sn(H_2BO_3)_2$ | 493 | 85 |
| $Si(HBO_3)_2$ | 326 | 82 |
| $Si(H_2BO_3)_4$ | 296 | 83 |
| $PbHBO_3$ | 443 | 84 |
| $Pb(H_2BO_3)_2$ | 421 | 86 |
| $CdHBO_3$ | 328 | 84 |
| $Bi_2(HBO_3)_3$ | 312 | 79 |
| $Bi(H_2BO_3)_3$ | 289 | 81 |
| $In_2(HBO_3)_3$ | 385 | 84 |
| $In(H_2BO_3)_3$ | 368 | 86 |
| $ZnHBO_3$ | 268 | 79 |
| $Zn(H_2BO_3)_2$ | 268 | 81 |
| $Ga_2(HBO_3)_3$ | 338 | 79 |
| $Ga(H_2BO_3)_3$ | 312 | 82 |
| $Ge(HBO_3)_2$ | 352 | 85 |
| $Ge(H_2BO_3)_4$ | 335 | 87 |
| $MgHBO_3$ | 296 | 84 |
| $Mg(H_2BO_3)_2$ | 286 | 86 |

TABLE 7

| Salt | Discharge capacity (mAh/g) | Capacity maintenance rate (%) |
|---|---|---|
| $Sb_2(HBO_3)_3$ | 310 | 80 |
| $Ba_{0.1}Sn_{0.9}HBO_3$ | 486 | 84 |
| $Ca_{0.1}Sn_{0.9}HBO_3$ | 482 | 85 |
| $Sr_{0.1}Sn_{0.9}HBO_3$ | 482 | 85 |
| $Mg_{0.1}Sn_{0.9}HBO_3$ | 479 | 84 |
| $Zn_{0.1}Sn_{0.9}HBO_3$ | 481 | 86 |
| $Cu_{0.1}Sn_{0.9}HBO_3$ | 469 | 87 |
| $Co_{0.1}Sn_{0.9}HBO_3$ | 467 | 85 |
| $Fe_{0.1}Sn_{0.9}HBO_3$ | 461 | 86 |
| $Ni_{0.1}Sn_{0.9}HBO_3$ | 449 | 87 |
| $Ti_{0.2}Sn_{0.7}HBO_3$ | 459 | 86 |
| $Cr_{0.1}Sn_{0.7}HBO_3$ | 449 | 88 |
| $V_{0.1}Sn_{0.9}HBO_3$ | 429 | 87 |
| $Mo_{0.1}Sn_{0.9}HBO_3$ | 438 | 87 |
| $W_{0.1}Sn_{0.8}HBO_3$ | 429 | 86 |
| $(Mn_{0.3}In_{0.9})_2(HBO_3)_3$ | 352 | 82 |
| $(Ni_{0.3}In_{0.8})_2(HBO_3)_3$ | 357 | 85 |
| $(Co_{0.3}In_{0.8})_3(HBO_3)_3$ | 349 | 85 |
| $(Mn_{0.3}Bi_{0.9})_2(HBO_3)_3$ | 291 | 82 |
| $(Ni_{0.3}Bi_{0.8})_2(HBO_3)_3$ | 281 | 82 |
| $(Co_{0.3}Bi_{0.8})_3(HBO_3)_3$ | 279 | 83 |

TABLE 8

| Salt | Discharge capacity (mAh/g) | Capacity maintenance rate (%) |
|---|---|---|
| $Ba_{0.1}Pb_{0.9}HBO_3$ | 421 | 88 |
| $Ca_{0.1}Pb_{0.9}HBO_3$ | 429 | 87 |
| $Sr_{0.1}Pb_{0.9}HBO_3$ | 429 | 87 |
| $Mg_{0.1}Pb_{0.9}HBO_3$ | 428 | 88 |
| $Zn_{0.1}Pb_{0.9}HBO_3$ | 420 | 86 |
| $Cu_{0.1}Pb_{0.9}HBO_3$ | 419 | 85 |
| $Co_{0.1}Pb_{0.9}HBO_3$ | 425 | 84 |
| $Fe_{0.1}Pb_{0.9}HBO_3$ | 422 | 85 |
| $Ni_{0.1}Pb_{0.9}HBO_3$ | 428 | 86 |
| $Ti_{0.2}Pb_{0.7}HBO_3$ | 419 | 89 |
| $Cr_{0.1}Pb_{0.7}HBO_3$ | 401 | 85 |
| $V_{0.1}Pb_{0.9}HBO_3$ | 398 | 87 |
| $Mo_{0.1}Pb_{0.9}HBO_3$ | 392 | 86 |
| $W_{0.1}Pb_{0.8}HBO_3$ | 382 | 87 |

The batteries using the metal or semi-metal hydrogenborates of Example 3 as the anode active material have the improved cycle characteristics, compared with the prior art metal oxides.

EXAMPLE 4

The electrode characteristics of various salts of oxo-acids of sulfur specified in Tables 9 through 16 and used as the anode active material were evaluated in Example 4.

Tables 9 through 16 show the discharge capacities of the test cells and the capacity maintenance rates of the cylindrical batteries at the 100-th cycle measured under the same conditions as those of Example 1.

TABLE 9

| Salt | Discharge capacity (mAh/g) | Capacity maintenance rate (%) |
|---|---|---|
| $Al_2(SO_4)_3$ | 389 | 82 |
| $Al_2(SO_3)_3$ | 405 | 77 |
| $Al_2(S_2O_7)_3$ | 342 | 83 |
| $Al_2(SO_5)_3$ | 370 | 81 |
| $Al_2(S_2O_8)_3$ | 338 | 85 |
| $Al_2(S_2O_3)_3$ | 375 | 81 |
| $Al_2(S_2O_6)_3$ | 364 | 82 |
| $Al_2(S_2O_5)_3$ | 372 | 83 |
| $Al_2(S_2O_2)_3$ | 378 | 83 |
| $Al_2(S_2O_4)_3$ | 364 | 84 |
| $Al_2(SO_2)_3$ | 415 | 80 |
| $Sn(SO_4)_2$ | 482 | 85 |
| $Sn(SO_3)_2$ | 521 | 80 |
| $Sn(S_2O_7)_2$ | 416 | 86 |
| $Sn(SO_5)_2$ | 456 | 83 |
| $Sn(S_2O_8)_2$ | 403 | 84 |
| $Sn(S_2O_3)_2$ | 456 | 82 |
| $Sn(S_2O_6)_2$ | 423 | 88 |
| $Sn(S_2O_5)_2$ | 437 | 87 |
| $Sn(S_2O_2)_2$ | 464 | 84 |
| $Sn(S_2O_4)_2$ | 424 | 86 |
| $Sn(SO_2)_2$ | 510 | 82 |
| $SnSO_4$ | 532 | 82 |
| $SnSO_3$ | 556 | 79 |
| $SnS_2O_7$ | 482 | 85 |
| $SnSO_5$ | 502 | 83 |
| $Al(HSO_4)_3$ | 356 | 91 |
| $Al(HSO_3)_3$ | 375 | 87 |
| $Al(HS_2O_7)_3$ | 320 | 92 |
| $Al(HSO_5)_3$ | 335 | 91 |
| $Al(HS_2O_8)_3$ | 314 | 89 |
| $Al(HS_2O_3)_3$ | 346 | 88 |
| $Al(HS_2O_6)_3$ | 352 | 89 |
| $Al(HS_2O_5)_3$ | 346 | 90 |
| $Al(HS_2O_2)_3$ | 348 | 91 |
| $Al(HS_2O_4)_3$ | 334 | 92 |
| $Al(HSO_2)_3$ | 358 | 89 |
| $Sn(HSO_4)_4$ | 446 | 95 |
| $Sn(HSO_3)_4$ | 453 | 92 |
| $Sn(HS_2O_7)_4$ | 386 | 94 |
| $Sn(HSO_5)_4$ | 423 | 93 |
| $Sn(HS_2O_8)_4$ | 379 | 94 |
| $Sn(HS_2O_3)_4$ | 433 | 93 |
| $Sn(HS_2O_6)_4$ | 402 | 97 |
| $Sn(HS_2O_5)_4$ | 410 | 96 |
| $Sn(HS_2O_2)_4$ | 439 | 94 |
| $Sn(HS_2O_4)_4$ | 403 | 95 |
| $Sn(HSO_2)_4$ | 470 | 90 |
| $Sn(HSO_4)_2$ | 486 | 93 |
| $Sn(HSO_3)_2$ | 496 | 88 |
| $Sn(HS_2O_7)_2$ | 450 | 92 |
| $Sn(HSO_5)_2$ | 457 | 91 |

TABLE 10

| Salt | Discharge capacity (mAh/g) | Capacity maintenance rate (%) |
|---|---|---|
| $SnS_2O_8$ | 460 | 86 |
| $SnS_2O_3$ | 505 | 79 |
| $SnS_2O_6$ | 476 | 85 |
| $SnS_2O_5$ | 483 | 85 |
| $SnS_2O_2$ | 536 | 80 |
| $SnS_2O_4$ | 497 | 81 |
| $SnSO_2$ | 545 | 79 |
| $Si(SO_4)_2$ | 395 | 85 |
| $Si(SO_3)_2$ | 411 | 82 |
| $Si(S_2O_7)_2$ | 341 | 87 |
| $Si(SO_5)_2$ | 362 | 85 |
| $Si(S_2O_8)_2$ | 322 | 87 |
| $Si(S_2O_3)_2$ | 375 | 84 |
| $Si(S_2O_6)_2$ | 332 | 85 |
| $Si(S_2O_5)_2$ | 343 | 84 |
| $Si(S_2O_2)_2$ | 378 | 82 |
| $Si(S_2O_4)_2$ | 350 | 85 |
| $Si(SO_2)_2$ | 421 | 83 |
| $PbSO_4$ | 452 | 84 |
| $PbSO_3$ | 472 | 83 |
| $PbS_2O_7$ | 405 | 86 |
| $PbSO_5$ | 432 | 85 |
| $PbS_2O_8$ | 400 | 86 |
| $PbS_2O_3$ | 441 | 84 |
| $PbS_2O_6$ | 411 | 85 |
| $PbS_2O_5$ | 419 | 85 |
| $PbS_2O_2$ | 445 | 82 |
| $PbS_2O_4$ | 412 | 84 |
| $Sn(HS_2O_8)_2$ | 426 | 93 |
| $Sn(HS_2O_3)_2$ | 472 | 91 |
| $Sn(HS_2O_6)_2$ | 436 | 94 |
| $Sn(HS_2O_5)_2$ | 440 | 94 |
| $Sn(HS_2O_2)_2$ | 471 | 91 |
| $Sn(HS_2O_4)_2$ | 446 | 93 |
| $Sn(HSO_2)_2$ | 492 | 90 |
| $Si(HSO_4)_4$ | 362 | 93 |
| $Si(HSO_3)_4$ | 371 | 91 |
| $Si(HS_2O_7)_4$ | 312 | 94 |
| $Si(HSO_5)_4$ | 335 | 95 |
| $Si(HS_2O_8)_4$ | 294 | 96 |
| $Si(HS_2O_3)_4$ | 341 | 93 |
| $Si(HS_2O_6)_4$ | 309 | 95 |
| $Si(HS_2O_5)_4$ | 312 | 94 |
| $Si(HS_2O_2)_4$ | 340 | 92 |
| $Si(HS_2O_4)_4$ | 318 | 93 |
| $Si(HSO_2)_4$ | 390 | 90 |
| $Pb(HSO_4)_2$ | 415 | 92 |
| $Pb(HSO_3)_2$ | 426 | 91 |
| $Pb(HS_2O_7)_2$ | 386 | 95 |
| $Pb(HSO_5)_2$ | 403 | 94 |
| $Pb(HS_2O_8)_2$ | 376 | 95 |
| $Pb(HS_2O_3)_2$ | 411 | 94 |
| $Pb(HS_2O_6)_2$ | 389 | 96 |
| $Pb(HS_2O_5)_2$ | 399 | 95 |
| $Pb(HS_2O_2)_2$ | 419 | 91 |
| $Pb(HS_2O_4)_2$ | 391 | 93 |

TABLE 11

| Salt | Discharge capacity (mAh/g) | Capacity maintenance rate (%) |
|---|---|---|
| $PbSO_2$ | 475 | 81 |
| $CdSO_4$ | 414 | 79 |
| $CdSO_3$ | 426 | 78 |
| $CdS_2O_7$ | 378 | 81 |
| $CdSO_5$ | 404 | 82 |
| $CdS_2O_8$ | 369 | 84 |
| $CdS_2O_3$ | 410 | 78 |
| $CdS_2O_6$ | 398 | 79 |
| $CdS_2O_5$ | 401 | 80 |

TABLE 11-continued

| Salt | Discharge capacity (mAh/g) | Capacity maintenance rate (%) |
|---|---|---|
| $CdS_2O_2$ | 410 | 78 |
| $CdS_2O_4$ | 389 | 82 |
| $CdSO_2$ | 420 | 76 |
| $Bi_2(SO_4)_3$ | 364 | 76 |
| $Bi_2(SO_3)_3$ | 381 | 75 |
| $Bi_2(S_2O_7)_3$ | 324 | 79 |
| $Bi_2(S_2O_5)_3$ | 348 | 78 |
| $Bi_2(S_2O_8)_3$ | 315 | 81 |
| $Bi_2(S_2O_3)_3$ | 346 | 78 |
| $Bi_2(S_2O_6)_3$ | 329 | 78 |
| $Bi_2(S_2O_5)_3$ | 347 | 76 |
| $Bi_2(S_2O_2)_3$ | 352 | 75 |
| $Bi_2(S_2O_4)_3$ | 333 | 79 |
| $Bi_2(SO_2)_3$ | 379 | 75 |
| $In_2(SO_4)_3$ | 444 | 83 |
| $In_2(SO_3)_3$ | 459 | 81 |
| $In_2(S_2O_7)_3$ | 398 | 86 |
| $In_2(SO_5)_3$ | 421 | 83 |
| $In_2(S_2O_8)_3$ | 389 | 85 |
| $Pb(HSO_2)_2$ | 435 | 91 |
| $Cd(HSO_4)_2$ | 379 | 89 |
| $Cd(HSO_3)_2$ | 398 | 88 |
| $Cd(HS_2O_7)_2$ | 346 | 92 |
| $Cd(HSO_5)_2$ | 382 | 93 |
| $Cd(HS_2O_8)_2$ | 341 | 93 |
| $Cd(HS_2O_3)_2$ | 379 | 90 |
| $Cd(HS_2O_6)_2$ | 370 | 91 |
| $Cd(HS_2O_5)_2$ | 374 | 93 |
| $Cd(HS_2O_2)_2$ | 379 | 89 |
| $Cd(HS_2O_4)_2$ | 365 | 93 |
| $Cd(HSO_2)_2$ | 391 | 89 |
| $Bi(HSO_4)_3$ | 337 | 87 |
| $Bi(HSO_3)_3$ | 349 | 86 |
| $Bi(HS_2O_7)_3$ | 298 | 87 |
| $Bi(HSO_5)_3$ | 315 | 86 |
| $Bi(HS_2O_8)_3$ | 276 | 90 |
| $Bi(HS_2O_3)_3$ | 313 | 85 |
| $Bi(HS_2O_6)_3$ | 298 | 86 |
| $Bi(HS_2O_5)_3$ | 313 | 87 |
| $Bi(HS_2O_2)_3$ | 321 | 84 |
| $Bi(HS_2O_4)_3$ | 303 | 88 |
| $Bi(HSO_2)_3$ | 336 | 86 |
| $In(HSO_4)_3$ | 416 | 92 |
| $In(HSO_3)_3$ | 420 | 91 |
| $In(HS_2O_7)_3$ | 367 | 95 |
| $In(HSO_5)_3$ | 390 | 94 |
| $In(HS_2O_8)_3$ | 374 | 96 |

TABLE 12

| Salt | Discharge capacity (mAh/g) | Capacity maintenance rate (%) |
|---|---|---|
| $In_2(S_2O_3)_3$ | 432 | 84 |
| $In_2(S_2O_6)_3$ | 419 | 85 |
| $In_2(S_2O_5)_3$ | 416 | 85 |
| $In_2(S_2O_2)_3$ | 432 | 83 |
| $In_2(S_2O_4)_3$ | 398 | 86 |
| $In_2(SO_2)_3$ | 456 | 81 |
| $ZnSO_4$ | 362 | 75 |
| $ZnSO_3$ | 379 | 73 |
| $ZnS_2O_7$ | 334 | 76 |
| $ZnSO_5$ | 342 | 75 |
| $ZnS_2O_8$ | 320 | 76 |
| $ZnS_2O_3$ | 342 | 76 |
| $ZnS_2O_6$ | 320 | 76 |
| $ZnS_2O_5$ | 333 | 75 |
| $ZnS_2O_2$ | 354 | 74 |
| $ZnS_2O_4$ | 321 | 76 |
| $ZnSO_2$ | 382 | 73 |
| $MgSO_4$ | 333 | 81 |

TABLE 12-continued

| Salt | Discharge capacity (mAh/g) | Capacity maintenance rate (%) |
|---|---|---|
| $MgSO_3$ | 352 | 79 |
| $MgS_2O_7$ | 298 | 84 |
| $MgSO_5$ | 320 | 82 |
| $MgS_2O_8$ | 302 | 83 |
| $MgS_2O_3$ | 325 | 81 |
| $MgS_2O_6$ | 300 | 83 |
| $MgS_2O_5$ | 311 | 82 |
| $MgS_2O_2$ | 328 | 82 |
| $MgS_2O_4$ | 305 | 83 |
| $MgSO_2$ | 342 | 79 |
| $In(HS_2O_3)_3$ | 400 | 95 |
| $In(HS_2O_6)_3$ | 381 | 95 |
| $In(HS_2O_5)_3$ | 390 | 95 |
| $In(HS_2O_2)_3$ | 402 | 91 |
| $In(HS_2O_4)_3$ | 370 | 95 |
| $In(HSO_2)_3$ | 420 | 92 |
| $Zn(HSO_4)_2$ | 333 | 85 |
| $Zn(HSO_3)_2$ | 342 | 84 |
| $Zn(HS_2O_7)_2$ | 300 | 87 |
| $Zn(HSO_5)_2$ | 312 | 86 |
| $Zn(HS_2O_8)_2$ | 294 | 85 |
| $Zn(HS_2O_3)_2$ | 310 | 85 |
| $Zn(HS_2O_6)_2$ | 300 | 84 |
| $Zn(HS_2O_5)_2$ | 310 | 86 |
| $Zn(HS_2O_2)_2$ | 325 | 84 |
| $Zn(HS_2O_4)_2$ | 290 | 86 |
| $Zn(HSO_2)_2$ | 341 | 84 |
| $Mg(HSO_4)_2$ | 312 | 91 |
| $Mg(HSO_3)_2$ | 330 | 89 |
| $Mg(HS_2O_7)_2$ | 271 | 93 |
| $Mg(HSO_5)_2$ | 294 | 92 |
| $Mg(HS_2O_8)_2$ | 279 | 93 |
| $Mg(HS_2O_3)_2$ | 293 | 92 |
| $Mg(HS_2O_6)_2$ | 276 | 94 |
| $Mg(HS_2O_5)_2$ | 288 | 92 |
| $Mg(HS_2O_2)_2$ | 296 | 93 |
| $Mg(HS_2O_4)_2$ | 276 | 94 |
| $Mg(HSO_2)_2$ | 302 | 90 |

TABLE 13

| Salt | Discharge capacity (mAh/g) | Capacity maintenance rate (%) |
|---|---|---|
| $Ga_2(SO_4)_3$ | 364 | 76 |
| $Ga_2(SO_3)_3$ | 382 | 74 |
| $Ga_2(S_2O_7)_3$ | 321 | 79 |
| $Ga_2(SO_5)_3$ | 352 | 75 |
| $Ga_2(S_2O_8)_3$ | 312 | 77 |
| $Ga_2(S_2O_3)_3$ | 352 | 75 |
| $Ga_2(S_2O_6)_3$ | 333 | 76 |
| $Ga_2(S_2O_5)_3$ | 342 | 75 |
| $Ga_2(S_2O_2)_3$ | 354 | 74 |
| $Ga_2(S_2O_4)_3$ | 326 | 76 |
| $Ga_2(SO_2)_3$ | 375 | 73 |
| $Ge(SO_4)_2$ | 431 | 78 |
| $Ge(SO_3)_2$ | 449 | 75 |
| $Ge(S_2O_7)_2$ | 395 | 81 |
| $Ge(SO_5)_2$ | 423 | 78 |
| $Ge(S_2O_8)_2$ | 386 | 81 |
| $Ge(S_2O_3)_2$ | 425 | 77 |
| $Ge(S_2O_6)_2$ | 401 | 80 |
| $Ge(S_2O_5)_2$ | 408 | 79 |
| $Ge(S_2O_2)_2$ | 420 | 79 |
| $Ge(S_2O_4)_2$ | 390 | 82 |
| $Ge(SO_2)_2$ | 435 | 77 |
| $Cr_2(SO_4)_3$ | 353 | 81 |
| $Cr_2(SO_3)_3$ | 369 | 80 |
| $W(SeO_4)_2$ | 298 | 79 |
| $CoSO_4$ | 352 | 82 |
| $CoSO_3$ | 362 | 80 |

TABLE 13-continued

| Salt | Discharge capacity (mAh/g) | Capacity maintenance rate (%) |
|---|---|---|
| $NiSO_4$ | 349 | 81 |
| $Ga(HSO_4)_3$ | 339 | 86 |
| $Ga(HSO_3)_3$ | 352 | 85 |
| $Ga(HS_2O_7)_3$ | 301 | 88 |
| $Ga(HSO_5)_3$ | 315 | 84 |
| $Ga(HS_2O_8)_3$ | 294 | 86 |
| $Ga(HS_2O_3)_3$ | 321 | 87 |
| $Ga(HS_2O_6)_3$ | 303 | 87 |
| $Ga(HS_2O_5)_3$ | 318 | 86 |
| $Ga(HS_2O_2)_3$ | 321 | 86 |
| $Ga(HS_2O_4)_3$ | 296 | 84 |
| $Ga(HSO_2)_3$ | 348 | 84 |
| $Ge(HSO_4)_4$ | 412 | 89 |
| $Ge(HSO_3)_4$ | 421 | 86 |
| $Ge(HS_2O_7)_4$ | 370 | 92 |
| $Ge(HSO_5)_4$ | 396 | 90 |
| $Ge(HS_2O_8)_4$ | 356 | 93 |
| $Ge(HS_2O_3)_4$ | 387 | 85 |
| $Ge(HS_2O_6)_4$ | 374 | 88 |
| $Ge(HS_2O_5)_4$ | 373 | 87 |
| $Ge(HS_2O_2)_4$ | 395 | 89 |
| $Ge(HS_2O_4)_4$ | 365 | 93 |
| $Ge(HSO_2)_4$ | 402 | 89 |
| $Cr(HSO_4)_3$ | 325 | 92 |
| $Cr(HSO_3)_3$ | 341 | 90 |
| $W(HSO_4)_4$ | 275 | 89 |
| $Co(HSO_4)_2$ | 321 | 92 |
| $Co(HSO_3)_2$ | 329 | 90 |
| $Ni(HSO_4)_2$ | 319 | 90 |

TABLE 14

| Salt | Discharge capacity (mAh/g) | Capacity maintenance rate (%) |
|---|---|---|
| $NiSO_3$ | 354 | 79 |
| $CuSO_4$ | 326 | 82 |
| $CuSO_3$ | 340 | 80 |
| $Ti_2(SO_4)_3$ | 315 | 83 |
| $Mo_2(SO_4)_3$ | 324 | 84 |
| $VSO_4$ | 306 | 83 |
| $MnSO_4$ | 345 | 82 |
| $MnSO_3$ | 356 | 80 |
| $FeSO_4$ | 354 | 81 |
| $FeSO_3$ | 362 | 78 |
| $Nb_2(SO_4)_5$ | 257 | 82 |
| $CaSO_4$ | 398 | 78 |
| $CaSO_3$ | 405 | 76 |
| $SrSO_4$ | 398 | 78 |
| $SrSO_3$ | 405 | 76 |
| $BaSO_4$ | 375 | 79 |
| $BaSO_3$ | 386 | 78 |
| $Ni(HSO_3)_2$ | 326 | 88 |
| $Cu(HSO_4)_2$ | 301 | 93 |
| $Cu(HSO_3)_2$ | 319 | 91 |
| $Ti(HSO_4)_3$ | 284 | 90 |
| $Mo(HSO_4)_3$ | 299 | 92 |
| $V(HSO_4)_2$ | 274 | 92 |
| $Mn(HSO_4)_2$ | 315 | 93 |
| $Mn(HSO_3)_2$ | 320 | 90 |
| $Fe(HSO_4)_2$ | 327 | 91 |
| $Fe(HSO_3)_2$ | 333 | 89 |
| $Nb(HSO_4)_5$ | 229 | 90 |
| $Ca(HSO_4)_2$ | 375 | 87 |
| $Ca(HSO_3)_2$ | 381 | 85 |
| $Sr(HSO_4)_2$ | 375 | 87 |
| $Sr(HSO_3)_2$ | 381 | 85 |
| $Ba(HSO_4)_2$ | 352 | 87 |
| $Ba(HSO_3)_2$ | 360 | 86 |

TABLE 15

| Salt | Discharge capacity (mAh/g) | Capacity maintenance rate (%) |
|---|---|---|
| $Mg_{0.1}Sn_{0.9}SO_4$ | 503 | 84 |
| $Sr_{0.1}Sn_{0.9}SO_4$ | 503 | 84 |
| $Ca_{0.1}Sn_{0.9}SO_4$ | 503 | 84 |
| $Zn_{0.1}Sn_{0.9}SO_4$ | 500 | 85 |
| $Ni_{0.1}Sn_{0.9}SO_4$ | 495 | 84 |
| $Fe_{0.1}Sn_{0.9}SO_4$ | 492 | 86 |
| $Co_{0.1}Sn_{0.9}SO_4$ | 489 | 87 |
| $Mn_{0.1}Sn_{0.9}SO_4$ | 482 | 86 |
| $Cu_{0.1}Sn_{0.9}SO_4$ | 485 | 85 |
| $Mo_{0.1}Sn_{0.9}SO_4$ | 476 | 84 |
| $V_{0.1}Sn_{0.9}SO_4$ | 473 | 86 |
| $W_{0.1}Sn_{0.8}SO_4$ | 459 | 83 |
| $Cr_{0.2}Sn_{0.7}SO_4$ | 476 | 84 |
| $Mo_{0.2}Sn_{0.7}SO_4$ | 476 | 85 |
| $Mg_{0.1}Pb_{0.9}SO_4$ | 420 | 86 |
| $Sr_{0.1}Pb_{0.9}SO_4$ | 420 | 86 |
| $Ca_{0.1}Pb_{0.9}SO_4$ | 420 | 86 |
| $Zn_{0.1}Pb_{0.9}SO_4$ | 421 | 87 |
| $Ni_{0.1}Pb_{0.9}SO_4$ | 415 | 86 |
| $Fe_{0.1}Pb_{0.9}SO_4$ | 410 | 87 |
| $Co_{0.1}Pb_{0.9}SO_4$ | 416 | 88 |
| $Mn_{0.1}Pb_{0.9}SO_4$ | 408 | 86 |
| $Cu_{0.1}Pb_{0.9}SO_4$ | 406 | 87 |
| $Mo_{0.1}Pb_{0.9}SO_4$ | 398 | 85 |
| $V_{0.1}Pb_{0.9}SO_4$ | 387 | 85 |
| $W_{0.1}Pb_{0.8}SO_4$ | 376 | 85 |
| $Cr_{0.2}Pb_{0.7}SO_4$ | 387 | 84 |
| $Mo_{0.2}Pb_{0.7}SO_4$ | 389 | 85 |
| $Mg_{0.1}Sn_{0.9}(HSO_4)_2$ | 481 | 94 |
| $Sr_{0.1}Sn_{0.9}(HSO_4)_2$ | 481 | 94 |
| $Ca_{0.1}Sn_{0.9}(HSO_4)_2$ | 481 | 94 |
| $Zn_{0.1}Sn_{0.9}(HSO_4)_2$ | 479 | 95 |
| $Ni_{0.1}Sn_{0.9}(HSO_4)_2$ | 470 | 95 |
| $Fe_{0.1}Sn_{0.9}(HSO_4)_2$ | 476 | 95 |
| $Co_{0.1}Sn_{0.9}(HSO_4)_2$ | 469 | 94 |
| $Mn_{0.1}Sn_{0.9}(HSO_4)_2$ | 465 | 96 |
| $Cu_{0.1}Sn_{0.9}(HSO_4)_2$ | 462 | 94 |
| $Mo_{0.1}Sn_{0.9}(HSO_4)_2$ | 459 | 95 |
| $V_{0.1}Sn_{0.9}(HSO_4)_2$ | 451 | 95 |
| $W_{0.1}Sn_{0.8}(HSO_4)_2$ | 432 | 94 |
| $Cr_{0.2}Sn_{0.7}(HSO_4)_2$ | 455 | 94 |
| $Mo_{0.2}Sn_{0.7}(HSO_4)_2$ | 452 | 95 |
| $Mg_{0.1}Pb_{0.9}(HSO_4)_2$ | 394 | 95 |
| $Sr_{0.1}Pb_{0.9}(HSO_4)_2$ | 394 | 95 |
| $Ca_{0.1}Pb_{0.9}(HSO_4)_2$ | 394 | 95 |
| $Zn_{0.1}Pb_{0.9}(HSO_4)_2$ | 394 | 94 |
| $Ni_{0.1}Pb_{0.9}(HSO_4)_2$ | 384 | 97 |
| $Fe_{0.1}Pb_{0.9}(HSO_4)_2$ | 381 | 95 |
| $Co_{0.1}Pb_{0.9}(HSO_4)_2$ | 384 | 96 |
| $Mn_{0.1}Pb_{0.9}(HSO_4)_2$ | 381 | 95 |
| $Cu_{0.1}Pb_{0.9}(HSO_4)_2$ | 386 | 96 |
| $Mo_{0.1}Pb_{0.9}(HSO_4)_2$ | 370 | 95 |
| $V_{0.1}Pb_{0.9}(HSO_4)_2$ | 368 | 94 |
| $W_{0.1}Pb_{0.5}(HSO_4)_2$ | 359 | 95 |
| $Cr_{0.2}Pb_{0.7}(HSO_4)_2$ | 364 | 94 |
| $Mo_{0.2}Pb_{0.7}(HSO_4)_2$ | 368 | 94 |

TABLE 16

| Salt | Discharge capacity (mAh/g) | Capacity maintenance rate (%) |
|---|---|---|
| $(Mg_{0.3}In_{0.8})_2(SO_4)_3$ | 410 | 85 |
| $(Zn_{0.3}In_{0.8})_2(SO_4)_3$ | 406 | 86 |
| $(Ni_{0.3}In_{0.8})_2(SO_4)_3$ | 398 | 86 |
| $(Co_{0.3}Bi_{0.8})_2(SO_4)_3$ | 333 | 80 |
| $(Fe_{0.3}Bi_{0.8})_2(SO_4)_3$ | 325 | 82 |
| $(Mn_{0.3}Bi_{0.8})_2(SO_4)_3$ | 330 | 80 |
| $Sn(SO_4)_{0.5}(HSO_4)$ | 498 | 90 |
| $Pb(SO_4)_{0.5}(HSO_4)$ | 425 | 90 |
| $In_2(SO_4)_{2.5}(HSO_4)$ | 425 | 90 |

TABLE 16-continued

| Salt | Discharge capacity (mAh/g) | Capacity maintenance rate (%) |
|---|---|---|
| $Bi_2(SO_4)_{2.5}(HSO_4)$ | 343 | 84 |
| $Co_{0.3}In_{0.8}(HSO_4)_3$ | 379 | 94 |
| $Fe_{0.3}In_{0.8}(HSO_4)_3$ | 370 | 95 |
| $Mn_{0.3}In_{0.8}(HSO_4)_3$ | 368 | 95 |
| $Mg_{0.3}Bi_{0.8}(HSO_4)_3$ | 298 | 90 |
| $Zn_{0.3}Bi_{0.8}(HSO_4)_3$ | 289 | 89 |
| $Ni_{0.3}Bi_{0.8}(HSO_4)_3$ | 295 | 91 |
| $Sn(SO_4)_{0.9}(HSO_4)_{0.2}$ | 519 | 86 |
| $Pb(SO_4)_{0.9}(HSO_4)_{0.2}$ | 438 | 87 |
| $In_2(SO_4)_{2.9}(HSO_4)_{0.2}$ | 438 | 86 |
| $Bi_2(SO_4)_{2.9}(HSO_4)_{0.2}$ | 350 | 80 |

After the conclusion of cathode polarization of the test cells in the tenth cycle, the test cells were decomposed. No deposit of metallic lithium was observed in any of the test cells of Example 4.

The batteries using the metal or semi-metal sulfate, sulfite, disulfate, peroxomonosulfate, peroxodisulfate, thiosulfate, disulfite, thiosulfite, hydrogensulfate, thionate, or sulfoxylate of Example 4 as the anode active material have the improved cycle characteristics, compared with the prior art metal oxides. Especially the use of hydrogensulfates has remarkably improved the cycle characteristics.

EXAMPLE 5

The electrode characteristics of various salts of oxo-acids of selenium specified in Tables 17 through 20 and used as the anode active material were evaluated in Example 5.

Tables 17 through 20 show the discharge capacities of the test cells and the capacity maintenance rates of the cylindrical batteries at the 100-th cycle measured under the same conditions as those of Example 1.

TABLE 17

| Salt | Discharge capacity (mAh/g) | Capacity maintenance rate (%) |
|---|---|---|
| $Al_2(SeO_4)_3$ | 362 | 83 |
| $Al_2(SeO_3)_3$ | 387 | 80 |
| $Sn(SeO_4)_2$ | 462 | 84 |
| $Sn(SeO_3)_2$ | 483 | 81 |
| $SnSeO_4$ | 512 | 83 |
| $SnSeO_3$ | 521 | 80 |
| $Sn_2SeO_5$ | 534 | 79 |
| $Si(SeO_4)_2$ | 364 | 84 |
| $Si(SeO_3)_2$ | 379 | 80 |
| $PbSeO_4$ | 432 | 85 |
| $PbSeO_3$ | 445 | 82 |
| $Pb_2SeO_5$ | 498 | 80 |
| $CdSeO_4$ | 386 | 80 |
| $CdSeO_3$ | 399 | 78 |
| $Bi_2(SeO_4)_3$ | 339 | 77 |
| $Bi_2(SeO_3)_3$ | 349 | 72 |
| $In_2(SeO_4)_3$ | 421 | 85 |
| $In_2(SeO_3)_3$ | 438 | 83 |
| $ZnSeO_4$ | 339 | 74 |
| $ZnSeO_3$ | 348 | 70 |
| $MgSeO_4$ | 310 | 82 |
| $MgSeO_3$ | 321 | 79 |
| $Ga_2(SeO_4)_3$ | 339 | 75 |
| $Ga_2(SeO_3)_3$ | 349 | 73 |
| $Ge(SeO_4)_2$ | 405 | 77 |
| $Ge(SeO_3)_2$ | 420 | 72 |
| $Al(HSeO_4)_3$ | 341 | 92 |
| $Al(HSeO_3)_3$ | 367 | 89 |

TABLE 17-continued

| Salt | Discharge capacity (mAh/g) | Capacity maintenance rate (%) |
|---|---|---|
| $Sn(HSeO_4)_4$ | 442 | 92 |
| $Sn(HSeO_3)_4$ | 462 | 93 |
| $Sn(HSeO_4)_2$ | 489 | 94 |
| $Sn(HSeO_3)_2$ | 501 | 90 |
| $SnSeO_5$ | 508 | 84 |
| $Si(HSeO_4)_4$ | 342 | 92 |
| $Si(HSeO_3)_4$ | 347 | 90 |
| $Pb(HSeO_4)_2$ | 412 | 93 |
| $Pb(HSeO_3)_2$ | 421 | 92 |
| $PbSeO_5$ | 425 | 85 |
| $Cd(HSeO_4)_2$ | 364 | 90 |
| $Cd(HSeO_3)_2$ | 374 | 88 |
| $Bi(HSeO_4)_3$ | 314 | 89 |
| $Bi(HSeO_3)_3$ | 321 | 86 |
| $In(HSeO_4)_3$ | 397 | 94 |
| $In(HSeO_3)_3$ | 409 | 93 |
| $Zn(HSeO_4)_2$ | 315 | 85 |
| $Zn(HSeO_3)_2$ | 320 | 83 |
| $Mg(HSeO_4)_2$ | 289 | 92 |
| $Mg(HSeO_3)_2$ | 301 | 87 |
| $Ga(HSeO_4)_3$ | 314 | 86 |
| $Ga(HSeO_3)_3$ | 324 | 84 |
| $Ge(HSeO_4)_4$ | 385 | 86 |
| $Ge(HSeO_3)_4$ | 396 | 83 |

TABLE 18

| Salt | Discharge capacity (mAh/g) | Capacity maintenance rate (%) |
|---|---|---|
| $Cr_2(SeO_4)_3$ | 321 | 75 |
| $Cr_2(SeO_3)_3$ | 331 | 76 |
| $W(SeO_4)_2$ | 257 | 72 |
| $CoSeO_4$ | 286 | 73 |
| $CoSeO_3$ | 297 | 76 |
| $NiSeO_4$ | 286 | 76 |
| $NiSeO_3$ | 299 | 76 |
| $CuSeO_4$ | 287 | 73 |
| $CuSeO_3$ | 289 | 74 |
| $Ti_2(SeO_4)_3$ | 253 | 77 |
| $Mo_2(SeO_4)_3$ | 223 | 73 |
| $VSeO_4$ | 282 | 79 |
| $MnSeO_4$ | 265 | 73 |
| $MnSeO_3$ | 276 | 75 |
| $FeSeO_4$ | 282 | 74 |
| $FeSeO_3$ | 293 | 75 |
| $Nb_2(SeO_4)_5$ | 215 | 75 |
| $CaSeO_4$ | 321 | 74 |
| $CaSeO_3$ | 334 | 76 |
| $SrSeO_3$ | 334 | 76 |
| $BaSeO_4$ | 345 | 73 |
| $BaSeO_3$ | 353 | 74 |
| $Sb_2(SeO_4)_3$ | 364 | 72 |
| $Ir_2(SeO_4)_3$ | 345 | 73 |
| $Cr(HSeO_4)_3$ | 305 | 84 |
| $Cr(HSeO_3)_3$ | 314 | 86 |
| $W(HSeO_4)_4$ | 234 | 83 |
| $Co(HSeO_4)_2$ | 261 | 82 |
| $Co(HSeO_3)_2$ | 271 | 85 |
| $Ni(HSeO_4)_2$ | 264 | 84 |
| $Ni(HSeO_3)_2$ | 274 | 85 |
| $Cu(HSeO_4)_2$ | 264 | 84 |
| $Cu(HSeO_3)_2$ | 259 | 84 |
| $Ti(HSeO_4)_3$ | 230 | 86 |
| $Mo(HSeO_4)_3$ | 201 | 84 |
| $V(HSeO_4)_2$ | 261 | 89 |
| $Mn(HSeO_4)_2$ | 241 | 82 |
| $Mn(HSeO_3)_2$ | 251 | 84 |
| $Fe(HSeO_4)_2$ | 260 | 86 |
| $Fe(HSeO_3)_2$ | 271 | 85 |
| $Nb(HSeO_4)_5$ | 195 | 84 |

TABLE 18-continued

| Salt | Discharge capacity (mAh/g) | Capacity maintenance rate (%) |
|---|---|---|
| $Ca(HSeO_4)_2$ | 301 | 82 |
| $Ca(HSeO_3)_2$ | 309 | 85 |
| $Sr(HSeO_3)_2$ | 309 | 85 |
| $Ba(HSeO_4)_2$ | 314 | 84 |
| $Ba(HSeO_3)_2$ | 321 | 83 |
| $Sb(HSeO_4)_3$ | 335 | 86 |
| $Ir(HSeO_4)_3$ | 315 | 85 |

TABLE 19

| Salt | Discharge capacity (mAh/g) | Capacity maintenance rate (%) |
|---|---|---|
| $Mg_{0.1}Sn_{0.9}SeO_4$ | 486 | 85 |
| $Zn_{0.1}Sn_{0.9}SeO_4$ | 484 | 86 |
| $Ni_{0.1}Sn_{0.9}SeO_4$ | 472 | 85 |
| $Fe_{0.1}Sn_{0.9}SeO_4$ | 471 | 86 |
| $Co_{0.1}Sn_{0.9}SeO_4$ | 476 | 87 |
| $Mn_{0.1}Sn_{0.9}SeO_4$ | 483 | 84 |
| $Cu_{0.1}Sn_{0.9}SeO_4$ | 475 | 85 |
| $Mo_{0.1}Sn_{0.9}SeO_4$ | 465 | 86 |
| $V_{0.1}Sn_{0.9}SeO_4$ | 459 | 88 |
| $W_{0.1}Sn_{0.8}SeO_4$ | 443 | 88 |
| $Cr_{0.2}Sn_{0.7}SeO_4$ | 433 | 86 |
| $Ca_{0.1}Sn_{0.9}SeO_4$ | 492 | 85 |
| $Sr_{0.1}Sn_{0.9}SeO_4$ | 492 | 85 |
| $Ba_{0.1}Sn_{0.9}SeO_4$ | 475 | 86 |
| $Mg_{0.1}Pb_{0.9}SeO_4$ | 415 | 85 |
| $Zn_{0.1}Pb_{0.9}SeO_4$ | 409 | 86 |
| $Ni_{0.1}Pb_{0.9}SeO_4$ | 414 | 87 |
| $Fe_{0.1}Pb_{0.9}SeO_4$ | 401 | 88 |
| $Co_{0.1}Pb_{0.9}SeO_4$ | 405 | 86 |
| $Mn_{0.1}Pb_{0.9}SeO_4$ | 403 | 84 |
| $Cu_{0.1}Pb_{0.9}SeO_4$ | 402 | 85 |
| $Mo_{0.1}Pb_{0.9}SeO_4$ | 394 | 85 |
| $V_{0.1}Pb_{0.9}SeO_4$ | 396 | 84 |
| $W_{0.1}Pb_{0.8}SeO_4$ | 379 | 86 |
| $Cr_{0.2}Pb_{0.7}SeO_4$ | 368 | 85 |
| $Ca_{0.1}Pb_{0.9}SeO_4$ | 408 | 85 |
| $Sr_{0.1}Pb_{0.9}SeO_4$ | 408 | 85 |
| $Ba_{0.1}Pb_{0.9}SeO_4$ | 381 | 86 |
| $Mg_{0.1}Sn_{0.9}(HSeO_4)_2$ | 453 | 94 |
| $Zn_{0.1}Sn_{0.9}(HSeO_4)_2$ | 461 | 96 |
| $Ni_{0.1}Sn_{0.9}(HSeO_4)_2$ | 453 | 95 |
| $Fe_{0.1}Sn_{0.9}(HSeO_4)_2$ | 449 | 94 |
| $Co_{0.1}Sn_{0.9}(HSeO_4)_2$ | 448 | 95 |
| $Mn_{0.1}Sn_{0.9}(HSeO_4)_2$ | 457 | 92 |
| $Cu_{0.1}Sn_{0.9}(HSeO_4)_2$ | 453 | 94 |
| $Mo_{0.1}Sn_{0.9}(HSeO_4)_2$ | 441 | 95 |
| $V_{0.1}Sn_{0.9}(HSeO_4)_2$ | 432 | 97 |
| $W_{0.1}Sn_{0.8}(HSeO_4)_2$ | 420 | 96 |
| $Cr_{0.2}Sn_{0.7}(HSeO_4)_2$ | 416 | 95 |
| $Ca_{0.1}Sn_{0.9}(HSeO_4)_2$ | 470 | 95 |
| $Sr_{0.1}Sn_{0.9}(HSeO_4)_2$ | 470 | 95 |
| $Ba_{0.1}Sn_{0.9}(HSeO_4)_2$ | 448 | 94 |
| $Mg_{0.1}Pb_{0.9}(HSeO_4)_2$ | 385 | 94 |
| $Zn_{0.1}Pb_{0.9}(HSeO_4)_2$ | 389 | 95 |
| $Ni_{0.1}Pb_{0.9}(HSeO_4)_2$ | 391 | 96 |
| $Fe_{0.1}Pb_{0.9}(HSeO_4)_2$ | 371 | 98 |
| $Co_{0.1}Pb_{0.9}(HSeO_4)_2$ | 379 | 95 |
| $Mn_{0.1}Pb_{0.9}(HSeO_4)_2$ | 371 | 95 |
| $Cu_{0.1}Pb_{0.9}(HSeO_4)_2$ | 376 | 96 |
| $Mo_{0.1}Pb_{0.9}(HSeO_4)_2$ | 370 | 94 |
| $V_{0.1}Pb_{0.9}(HSeO_4)_2$ | 369 | 95 |
| $W_{0.1}Pb_{0.8}(HSeO_4)_2$ | 349 | 97 |
| $Cr_{0.2}Pb_{0.7}(HSeO_4)_2$ | 333 | 96 |
| $Ca_{0.1}Pb_{0.9}(HSeO_4)_2$ | 379 | 94 |
| $Sr_{0.1}Pb_{0.9}(HSeO_4)_2$ | 379 | 94 |
| $Ba_{0.1}Pb_{0.9}(HSeO_4)_2$ | 353 | 96 |

TABLE 20

| Salt | Discharge capacity (mAh/g) | Capacity maintenance rate (%) |
|---|---|---|
| $(Mg_{0.3}In_{0.8})_2(SeO_4)_3$ | 398 | 86 |
| $(Zn_{0.3}In_{0.8})_2(SeO_4)_3$ | 387 | 87 |
| $(Ni_{0.3}In_{0.8})_2(SeO_4)_3$ | 379 | 86 |
| $(Co_{0.3}Bi_{0.8})_2(SeO_4)_3$ | 318 | 80 |
| $(Fe_{0.3}Bi_{0.8})_2(SeO_4)_3$ | 310 | 82 |
| $(Mn_{0.3}Bi_{0.8})_2(SeO_4)_3$ | 320 | 82 |
| $Co_{0.3}In_{0.8}(HSeO_4)_3$ | 374 | 95 |
| $Fe_{0.3}In_{0.8}(HSeO_4)_3$ | 361 | 98 |
| $Mn_{0.3}In_{0.8}(HSeO_4)_3$ | 348 | 96 |
| $Mg_{0.3}Bi_{0.8}(HSeO_4)_3$ | 279 | 91 |
| $Zn_{0.3}Bi_{0.8}(HSeO_4)_3$ | 284 | 92 |
| $Ni_{0.3}Bi_{0.8}(HSeO_4)_3$ | 298 | 93 |

After the conclusion of cathode polarization of the test cells in the tenth cycle, the test cells were decomposed. No deposit of metallic lithium was observed in any of the test cells of Example 5.

The batteries using the metal or semi-metal selenate, selenite, hydrogenselenate, or hydrogenselenite of Example 5 as the anode active material have the improved cycle characteristics, compared with the prior art metal oxides. Especially the use of hydrogenselenates and hydrogenselenites has remarkably improved the cycle characteristics.

EXAMPLE 6

The electrode characteristics of various salts of oxo-acids of tellurium specified in Tables 21 through 23 and used as the anode active material were evaluated in Example 6.

Tables 21 through 23 show the discharge capacities of the test cells and the capacity maintenance rates of the cylindrical batteries at the 100-th cycle measured under the same conditions as those of Example 1.

TABLE 21

| Salt | Discharge capacity (mAh/g) | Capacity maintenance rate (%) |
|---|---|---|
| $Al_2(TeO_4)_3$ | 346 | 82 |
| $SnTeO_4$ | 426 | 84 |
| $SnTe_3O_8$ | 385 | 87 |
| $Sn_3TeO_6$ | 489 | 85 |
| $Si(TeO_4)_2$ | 337 | 83 |
| $PbTeO_4$ | 405 | 84 |
| $PbTe_3O_8$ | 352 | 85 |
| $Pb_3TeO_6$ | 453 | 82 |
| $CdTeO_4$ | 354 | 79 |
| $Bi_2(TeO_4)_3$ | 314 | 79 |
| $Bi_2TeO_6$ | 345 | 77 |
| $In_2(TeO_4)_3$ | 384 | 82 |
| $In_2TeO_6$ | 405 | 80 |
| $Sb_2TeO_6$ | 384 | 78 |
| $Ir_2TeO_6$ | 351 | 78 |
| $ZnTeO_4$ | 302 | 75 |
| $MgTeO_4$ | 289 | 81 |
| $Ga_2TeO_6$ | 314 | 74 |
| $Ge(TeO_4)_2$ | 370 | 75 |
| $Ti_2TeO_6$ | 221 | 78 |
| $Cr_2TeO_6$ | 287 | 74 |
| $NiTeO_4$ | 253 | 76 |
| $FeTeO_4$ | 254 | 75 |
| $MnTeO_4$ | 247 | 74 |
| $CoTeO_4$ | 253 | 75 |
| $VTeO_4$ | 241 | 76 |
| $CuTeO_4$ | 251 | 75 |
| $Al(HTeO_4)_3$ | 319 | 89 |

TABLE 21-continued

| Salt | Discharge capacity (mAh/g) | Capacity maintenance rate (%) |
|---|---|---|
| $Sn(HTeO_4)_2$ | 397 | 90 |
| $SnH_4TeO_6$ | 359 | 95 |
| $Sn_2H_2TeO_6$ | 459 | 94 |
| $Si(HTeO_4)_4$ | 307 | 93 |
| $Pb(HTeO_4)_2$ | 372 | 92 |
| $PbH_4TeO_6$ | 321 | 94 |
| $Pb_2H_2TeO_6$ | 426 | 93 |
| $Cd(HTeO_4)_2$ | 320 | 90 |
| $Bi(HTeO_4)_3$ | 284 | 87 |
| $BiH_3TeO_6$ | 314 | 87 |
| $In(HTeO_4)_3$ | 359 | 89 |
| $InH_3TeO_6$ | 374 | 90 |
| $SbH_3TeO_6$ | 352 | 89 |
| $IrH_3TeO_6$ | 321 | 88 |
| $Zn(HTeO_4)_2$ | 275 | 86 |
| $Mg(HSeO_4)_2$ | 264 | 89 |
| $GaH_3TeO_6$ | 275 | 86 |
| $Ge(HTeO_4)_4$ | 342 | 86 |
| $TiH_3TeO_6$ | 198 | 87 |
| $CrH_3TeO_6$ | 255 | 86 |
| $Ni(HTeO_4)_2$ | 234 | 87 |
| $Fe(HSeO_4)_2$ | 229 | 86 |
| $Mn(HTeO_4)_2$ | 219 | 85 |
| $Co(HSeO_4)_2$ | 218 | 85 |
| $V(HTeO_4)_2$ | 214 | 87 |
| $Cu(HTeO_4)_2$ | 216 | 85 |

TABLE 22

| Salt | Discharge capacity (mAh/g) | Capacity maintenance rate (%) |
|---|---|---|
| $MoTeO_4$ | 234 | 73 |
| $W(TeO_4)_2$ | 215 | 73 |
| $CaTeO_4$ | 315 | 74 |
| $SrTeO_4$ | 315 | 74 |
| $BaTeO_4$ | 305 | 75 |
| $Mg_{0.1}Sn_{0.9}TeO_4$ | 402 | 86 |
| $Ca_{g0.1}Sn_{0.9}TeO_4$ | 402 | 86 |
| $Sr_{g0.1}Sn_{0.9}TeO_4$ | 402 | 86 |
| $Zn_{0.1}Sn_{0.9}TeO_4$ | 405 | 85 |
| $Ni_{0.1}Sn_{0.9}TeO_4$ | 400 | 86 |
| $Fe_{0.1}Sn_{0.9}TeO_4$ | 398 | 87 |
| $Co_{0.1}Sn_{0.9}TeO_4$ | 396 | 86 |
| $Mn_{0.1}Sn_{0.9}TeO_4$ | 389 | 85 |
| $Cu_{0.1}Sn_{0.9}TeO_4$ | 390 | 85 |
| $Mo_{0.1}Sn_{0.9}TeO_4$ | 379 | 87 |
| $V_{0.1}Sn_{0.9}TeO_4$ | 378 | 88 |
| $W_{0.1}Sn_{0.8}TeO_4$ | 369 | 85 |
| $Cr_{0.2}Sn_{0.7}TeO_4$ | 374 | 86 |
| $Mg_{0.1}Pb_{0.9}TeO_4$ | 375 | 86 |
| $Ca_{0.1}Pb_{0.9}TeO_4$ | 375 | 86 |
| $Sr_{0.1}Pb_{0.9}TeO_4$ | 375 | 86 |
| $Zn_{0.1}Pb_{0.9}TeO_4$ | 379 | 85 |
| $Ni_{0.1}Pb_{0.9}TeO_4$ | 370 | 87 |
| $Fe_{0.1}Pb_{0.9}TeO_4$ | 367 | 88 |
| $Co_{0.1}Pb_{0.9}TeO_4$ | 368 | 87 |
| $Mn_{0.1}Pb_{0.9}TeO_4$ | 364 | 86 |
| $Cu_{0.1}Pb_{0.9}TeO_4$ | 362 | 87 |
| $Mo_{0.1}Pb_{0.9}TeO_4$ | 354 | 87 |
| $V_{0.1}Pb_{0.9}TeO_4$ | 352 | 86 |
| $W_{0.1}Pb_{0.8}TeO_4$ | 341 | 85 |
| $Mo(HTeO_4)_2$ | 215 | 81 |
| $W(HTeO_4)_4$ | 185 | 82 |
| $Ca(HTeO_4)_2$ | 289 | 84 |
| $Sr(HTeO_4)_2$ | 289 | 84 |
| $Ba(HTeO_4)_2$ | 279 | 83 |
| $Mg_{0.1}Sn_{0.9}(HTeO_4)_2$ | 375 | 95 |
| $Ca_{0.1}Sn_{0.9}(HTeO_4)_2$ | 375 | 95 |
| $Sr_{0.1}Sn_{0.9}(HTeO_4)_2$ | 375 | 95 |
| $Zn_{0.1}Sn_{0.9}(HTeO_4)_2$ | 379 | 94 |

TABLE 22-continued

| Salt | Discharge capacity (mAh/g) | Capacity maintenance rate (%) |
|---|---|---|
| $Ni_{0.1}Sn_{0.9}(HTeO_4)_2$ | 374 | 95 |
| $Fe_{0.1}Sn_{0.9}(HTeO_4)_2$ | 370 | 96 |
| $Co_{0.1}Sn_{0.9}(HTeO_4)_2$ | 375 | 95 |
| $Mn_{0.1}Sn_{0.9}(HTeO_4)_2$ | 369 | 94 |
| $Cu_{0.1}Sn_{0.9}(HTeO_4)_2$ | 371 | 94 |
| $Mo_{0.1}Sn_{0.9}(HTeO_4)_2$ | 352 | 95 |
| $V_{0.1}Sn_{0.9}(HTeO_4)_2$ | 349 | 97 |
| $W_{0.1}Sn_{0.8}(HTeO_4)_2$ | 342 | 95 |
| $Cr_{0.2}Sn_{0.7}(HTeO_4)_2$ | 344 | 94 |
| $Mg_{0.1}Pb_{0.9}(HTeO_4)_2$ | 335 | 95 |
| $Ca_{0.1}Pb_{0.9}(HTeO_4)_2$ | 335 | 95 |
| $Sr_{0.1}Pb_{0.9}(HTeO_4)_2$ | 335 | 95 |
| $Zn_{0.1}Pb_{0.9}(HTeO_4)_2$ | 339 | 94 |
| $Ni_{0.1}Pb_{0.9}(HTeO_4)_2$ | 348 | 95 |
| $Fe_{0.1}Pb_{0.9}(HTeO_4)_2$ | 332 | 96 |
| $Co_{0.1}Pb_{0.9}(HTeO_4)_2$ | 321 | 95 |
| $Mn_{0.1}Pb_{0.9}(HTeO_4)_2$ | 322 | 94 |
| $Cu_{0.1}Pb_{0.9}(HTeO_4)_2$ | 337 | 95 |
| $Mo_{0.1}Pb_{0.9}(HTeO_4)_2$ | 326 | 94 |
| $V_{0.1}Pb_{0.9}(HTeO_4)_2$ | 322 | 95 |
| $W_{0.1}Pb_{0.8}(HTeO_4)_2$ | 320 | 96 |

TABLE 23

| Salt | Discharge capacity (mAh/g) | Capacity maintenance rate (%) |
|---|---|---|
| $Cr_{0.2}Pb_{0.7}TeO_4$ | 361 | 84 |
| $(Mg_{0.3}In_{0.8})_2TeO_6$ | 374 | 82 |
| $(Zn_{0.3}In_{0.8})_2TeO_6$ | 370 | 83 |
| $(Fe_{0.3}In_{0.8})_2TeO_6$ | 364 | 84 |
| $(Mg_{0.3}Bi_{0.8})_2TeO_6$ | 315 | 79 |
| $(Zn_{0.3}Bi_{0.8})_2TeO_6$ | 318 | 80 |
| $(Fe_{0.3}Bi_{0.8})_2TeO_6$ | 308 | 81 |
| $Cr_{0.2}Pb_{0.7}(HTeO_4)_2$ | 337 | 93 |
| $Co_{0.3}In_{0.8}H_3TeO_6$ | 351 | 93 |
| $Ni_{0.3}In_{0.8}H_3TeO_6$ | 341 | 92 |
| $Mn_{0.3}In_{0.8}H_3TeO_6$ | 338 | 92 |
| $Co_{0.3}Bi_{0.8}H_3TeO_6$ | 287 | 88 |
| $Ni_{0.3}Bi_{0.8}H_3TeO_6$ | 286 | 90 |
| $Mn_{0.3}Bi_{0.8}H_3TeO_6$ | 279 | 90 |

After the conclusion of cathode polarization of the test cells in the tenth cycle, the test cells were decomposed. No deposit of metallic lithium was observed in any of the test cells of Example 6.

The batteries using the metal or semi-metal tellurate or hydrogentellurate of Example 6 as the anode active material have the improved cycle characteristics, compared with the prior art metal oxides. Especially the use of hydrogentellurates has remarkably improved the cycle characteristics.

EXAMPLE 7

The electrode characteristics of various metal and semi-metal hydrogenphosphates, phosphinates, and phosphonates specified in Tables 24 through 27 and used as the anode active material were evaluated in Example 7.

Tables 24 through 27 show the discharge capacities of the test cells and the capacity maintenance rates of the cylindrical batteries at the 100-th cycle measured under the same conditions as those of Example 1.

TABLE 24

| Salt | Discharge capacity (mAh/g) | Capacity maintenance rate (%) |
|---|---|---|
| $Al(PH_2O_2)_3$ | 366 | 83 |
| $Al_2(PHO_3)_3$ | 353 | 84 |
| $Al_2(HPO_4)_3$ | 348 | 85 |
| $Al(H_2PO_4)_3$ | 315 | 87 |
| $Sn(PH_2O_2)_4$ | 412 | 88 |
| $Sn(PHO_3)_2$ | 455 | 89 |
| $Sn(HPO_4)_2$ | 452 | 88 |
| $Sn(H_2PO_4)_4$ | 384 | 89 |
| $Sn(PH_2O_2)_2$ | 452 | 82 |
| $SnPHO_3$ | 486 | 92 |
| $SnHPO_4$ | 485 | 95 |
| $Sn(H_2PO_4)_2$ | 402 | 86 |
| $Si(PH_2O_2)_4$ | 304 | 85 |
| $Si(PHO_3)_2$ | 332 | 86 |
| $Bi(PH_2O_2)_3$ | 333 | 82 |
| $Bi_2(PHO_3)_3$ | 345 | 83 |
| $Bi_2(HPO_4)_3$ | 340 | 83 |
| $Bi(H_2PO_4)_3$ | 324 | 85 |
| $In(PH_2O_2)_3$ | 365 | 82 |
| $In_2(PHO_3)_3$ | 380 | 81 |
| $In_2(HPO_4)_3$ | 377 | 83 |
| $In(H_2PO_4)_3$ | 333 | 86 |
| $Zn(PH_2O_2)_2$ | 298 | 83 |
| $ZnPHO_3$ | 298 | 83 |
| $ZnHPO_4$ | 295 | 83 |
| $Zn(H_2PO_4)_2$ | 264 | 84 |
| $Mg(PH_2O_2)_2$ | 281 | 84 |
| $MgPHO_3$ | 288 | 83 |

TABLE 25

| Salt | Discharge capacity (mAh/g) | Capacity maintenance rate (%) |
|---|---|---|
| $Si(HPO_4)_2$ | 322 | 87 |
| $Si(H_2PO_4)_4$ | 285 | 88 |
| $Pb(PH_2O_2)_2$ | 420 | 85 |
| $PbPHO_3$ | 425 | 85 |
| $PbHPO_4$ | 418 | 89 |
| $Pb(H_2PO_4)_2$ | 405 | 90 |
| $Cd(PH_2O_2)_2$ | 380 | 82 |
| $CdPHO_3$ | 385 | 83 |
| $CdHPO_4$ | 384 | 83 |
| $Cd(H_2PO_4)_2$ | 375 | 86 |
| $Sb_2(HPO_4)_3$ | 321 | 82 |
| $Ti_2(HPO_4)_3$ | 275 | 84 |
| $V_2(HPO_4)_3$ | 250 | 85 |
| $Cr_2(HPO_4)_3$ | 284 | 84 |
| $Mn_2(HPO_4)_3$ | 275 | 85 |
| $MgHPO_4$ | 286 | 84 |
| $Mg(H_2PO_4)_2$ | 267 | 87 |
| $Ga(PH_2O_2)_3$ | 321 | 82 |
| $Ga_2(PHO_3)_3$ | 335 | 83 |
| $Ga_2(HPO_4)_3$ | 325 | 84 |
| $Ga(H_2PO_4)_3$ | 305 | 86 |
| $Ge(PH_2O_2)_4$ | 367 | 83 |
| $Ge(PHO_3)_2$ | 382 | 84 |
| $Ge(HPO_4)_2$ | 375 | 87 |
| $Ge(H_2PO_4)_4$ | 342 | 89 |
| $Fe_2(HPO_4)_3$ | 264 | 85 |
| $CoHPO_4$ | 264 | 84 |
| $NiHPO_4$ | 261 | 84 |
| $CuHPO_4$ | 275 | 85 |

TABLE 26

| Salt | Discharge capacity (mAh/g) | Capacity maintenance rate (%) |
|---|---|---|
| $SrHPO_4$ | 332 | 85 |
| $Ca_{0.2}Sn_{0.8}HPO_4$ | 451 | 88 |
| $Sr_{0.2}Sn_{0.8}HPO_4$ | 451 | 88 |
| $Ba_{0.2}Sn_{0.8}HPO_4$ | 432 | 89 |
| $Zn_{0.2}Sn_{0.8}HPO_4$ | 437 | 92 |
| $Fe_{0.2}Sn_{0.8}HPO_4$ | 441 | 91 |
| $Ni_{0.2}Sn_{0.8}HPO_4$ | 438 | 92 |
| $Co_{0.2}Sn_{0.8}HPO_4$ | 442 | 92 |
| $Mn_{0.2}Sn_{0.8}HPO_4$ | 429 | 90 |
| $Ti_{0.2}Sn_{0.7}HPO_4$ | 415 | 91 |
| $Cu_{0.2}Sn_{0.8}HPO_4$ | 429 | 92 |
| $Cr_{0.2}Sn_{0.7}HPO_4$ | 418 | 93 |
| $V_{0.2}Sn_{0.8}HPO_4$ | 404 | 91 |
| $W_{0.1}Sn_{0.8}HPO_4$ | 406 | 90 |
| $BaHPO_4$ | 312 | 86 |
| $Ca_{0.2}Pb_{0.8}HPO_4$ | 372 | 90 |
| $Sr_{0.2}Pb_{0.8}HPO_4$ | 372 | 90 |
| $Ba_{0.2}Pb_{0.8}HPO_4$ | 359 | 91 |
| $Zn_{0.2}Pb_{0.8}HPO_4$ | 382 | 93 |
| $Fe_{0.2}Pb_{0.8}HPO_4$ | 374 | 94 |
| $Ni_{0.2}Pb_{0.8}HPO_4$ | 368 | 93 |
| $Co_{0.2}Pb_{0.8}HPO_4$ | 376 | 92 |
| $Mn_{0.2}Pb_{0.8}HPO_4$ | 374 | 93 |
| $Ti_{0.2}Pb_{0.7}HPO_4$ | 369 | 94 |
| $Cu_{0.2}Pb_{0.8}HPO_4$ | 371 | 93 |
| $Cr_{0.2}Pb_{0.7}HPO_4$ | 368 | 95 |
| $V_{0.2}Pb_{0.8}HPO_4$ | 365 | 93 |
| $W_{0.1}Pb_{0.8}HPO_4$ | 345 | 93 |

TABLE 27

| Salt | Discharge capacity (mAh/g) | Capacity maintenance rate (%) |
|---|---|---|
| $Sn_2(P_2O_7)_{0.9}(HPO_4)_{0.2}$ | 495 | 82 |
| $Sn_2(P_2O_7)_{0.8}(HPO_4)_{0.4}$ | 490 | 88 |
| $Pb_2(P_2O_7)_{0.9}(HPO_4)_{0.2}$ | 425 | 80 |
| $Pb_2(P_2O_7)_{0.8}(HPO_4)_{0.4}$ | 422 | 82 |

After the conclusion of cathode polarization of the test cells in the tenth cycle, the test cells were decomposed. No deposit of metallic lithium was observed in any of the test cells of Example 7.

The batteries using the metal or semi-metal hydrogenphosphate, phosphinate, or phosphonate of Example 7 as the anode active material have the improved cycle characteristics, compared with the prior art metal oxides.

EXAMPLE 8

The electrode characteristics of various metal and semi-metal cyanides, cyanates, and thiocyanates specified in Tables 28 through 30 and used as the anode active material were evaluated in Example 8.

Tables 28 through 30 show the discharge capacities of the test cells and the capacity maintenance rates of the cylindrical batteries at the 100-th cycle measured under the same conditions as those of Example 1.

TABLE 28

| Salt | Discharge capacity (mAh/g) | Capacity maintenance rate (%) |
|---|---|---|
| $Al(CN)_3$ | 382 | 76 |
| $Al(SCN)_3$ | 286 | 82 |
| $Al(ONC)_3$ | 364 | 80 |
| $Sn(CN)_4$ | 529 | 85 |
| $Sn(SCN)_4$ | 326 | 92 |
| $Sn(ONC)_4$ | 436 | 90 |
| $Sn(CN)_2$ | 537 | 82 |
| $Sn(SCN)_2$ | 487 | 95 |
| $Sn(ONC)_2$ | 506 | 93 |
| $Si(CN)_4$ | 315 | 76 |
| $Si(SCN)_4$ | 292 | 82 |
| $Si(ONC)_4$ | 310 | 79 |
| $Pb(CN)_2$ | 454 | 82 |
| $Pb(SCN)_2$ | 346 | 88 |
| $Pb(ONC)_2$ | 386 | 87 |
| $Cd(CN)_2$ | 372 | 75 |
| $Cd(SCN)_2$ | 315 | 79 |
| $Cd(ONC)_2$ | 340 | 79 |
| $Bi(CN)_3$ | 324 | 75 |
| $Bi(SCN)_3$ | 286 | 86 |
| $Bi(ONC)_3$ | 316 | 80 |
| $In(CN)_3$ | 412 | 82 |
| $In(SCN)_3$ | 375 | 89 |
| $In(ONC)_3$ | 369 | 86 |
| $Zn(CN)_2$ | 315 | 76 |
| $Zn(SCN)_2$ | 285 | 83 |
| $Zn(ONC)_2$ | 310 | 79 |
| $Ga(CN)_3$ | 348 | 74 |
| $Ga(SCN)_3$ | 302 | 79 |
| $Ga(ONC)_3$ | 326 | 76 |
| $Ge(CN)_4$ | 390 | 78 |
| $Ge(SCN)_4$ | 352 | 86 |
| $Ge(ONC)_4$ | 389 | 82 |
| $Mg(CN)_2$ | 320 | 79 |
| $Mg(SCN)_2$ | 289 | 89 |
| $Mg(ONC)_2$ | 341 | 85 |

TABLE 29

| Salt | Discharge capacity (mAh/g) | Capacity maintenance rate (%) |
|---|---|---|
| $Ti(CN)_3$ | 265 | 75 |
| $Ti(SCN)_3$ | 251 | 77 |
| $Ti(ONC)_3$ | 263 | 75 |
| $V(CN)_2$ | 275 | 81 |
| $V(SCN)_2$ | 245 | 82 |
| $V(ONC)_2$ | 263 | 80 |
| $Mn(CN)_2$ | 278 | 82 |
| $Mn(SCN)_2$ | 261 | 87 |
| $Mn(ONC)_2$ | 275 | 85 |
| $Sb(CN)_3$ | 315 | 76 |
| $Sb(SCN)_3$ | 281 | 80 |
| $Sb(ONC)_3$ | 298 | 78 |
| $Cr(CN)_3$ | 301 | 82 |
| $Cr(SCN)_3$ | 275 | 84 |
| $Cr(ONC)_3$ | 280 | 83 |
| $Fe(CN)_2$ | 269 | 75 |
| $Fe(SCN)_2$ | 245 | 79 |
| $Fe(ONC)_2$ | 257 | 79 |
| $W(CN)_4$ | 215 | 81 |
| $W(SCN)_4$ | 201 | 82 |
| $W(ONC)_4$ | 210 | 81 |
| $Co(CN)_2$ | 269 | 78 |
| $Co(SCN)_2$ | 245 | 84 |
| $Co(ONC)_2$ | 253 | 80 |
| $Ni(CN)_2$ | 275 | 82 |
| $Ni(SCN)_2$ | 257 | 86 |
| $Ni(ONC)_2$ | 261 | 81 |
| $Cu(CN)_2$ | 251 | 77 |
| $Cu(SCN)_2$ | 235 | 80 |

TABLE 29-continued

| Salt | Discharge capacity (mAh/g) | Capacity maintenance rate (%) |
|---|---|---|
| $Cu(ONC)_2$ | 246 | 78 |
| $Mo(CN)_3$ | 235 | 77 |
| $Mo(SCN)_3$ | 211 | 79 |
| $Mo(ONC)_3$ | 225 | 77 |
| $Ca(CN)_2$ | 325 | 78 |
| $Ca(SCN)_2$ | 314 | 84 |
| $Ca(ONC)_2$ | 322 | 80 |
| $Ba(CN)_2$ | 333 | 79 |
| $Ba(SCN)_2$ | 301 | 87 |
| $Ba(ONC)_2$ | 311 | 81 |
| $Nb(CN)_2$ | 222 | 82 |
| $Nb(SCN)_2$ | 201 | 83 |
| $Nb(ONC)_2$ | 216 | 81 |
| $Sr(SCN)_2$ | 314 | 84 |
| $Sr(ONC)_2$ | 322 | 80 |

TABLE 30

| Salt | Discharge capacity (mAh/g) | Capacity maintenance rate (%) |
|---|---|---|
| $ZnSn(CN)_4$ | 402 | 87 |
| $MgSn(SCN)_4$ | 382 | 92 |
| $CaSn(SCN)_4$ | 382 | 92 |
| $Sr(SCN)_4$ | 382 | 92 |
| $FeSn(ONC)_4$ | 376 | 91 |
| $NiSn(CN)_4$ | 398 | 88 |
| $CoSn(SCN)_4$ | 375 | 93 |
| $MnSn(ONC)_4$ | 390 | 92 |
| $TiSn(CN)_5$ | 385 | 87 |
| $CuSn(SCN)_4$ | 360 | 93 |
| $NiPb(CN)_4$ | 382 | 83 |
| $CoPb(SCN)_4$ | 362 | 85 |
| $MnPb(ONC)_4$ | 375 | 84 |
| $ZnPb(CN)_4$ | 395 | 84 |
| $MgPb(SCN)_4$ | 376 | 89 |
| $CaPb(SCN)_4$ | 376 | 89 |
| $SrPb(SCN)_4$ | 376 | 89 |
| $FePb(ONC)_4$ | 375 | 89 |
| $TiPb(CN)_5$ | 376 | 84 |
| $CuPb(SCN)_4$ | 326 | 89 |
| $CuIn(CN)_5$ | 355 | 84 |
| $FeIn(SCN)_5$ | 335 | 91 |
| $CoIn(ONC)_5$ | 345 | 88 |
| $MgIn(CN)_5$ | 365 | 85 |
| $CuBi(CN)_5$ | 324 | 78 |
| $FeBi(SCN)_5$ | 315 | 87 |
| $BaBi(ONC)_5$ | 320 | 83 |
| $CaBi(CN)_3$ | 321 | 77 |
| $MgBi(CN)_3$ | 315 | 78 |

After the conclusion of cathode polarization of the test cells in the tenth cycle, the test cells were decomposed. No deposit of metallic lithium was observed in any of the test cells of Example 8.

The batteries using the metal or semi-metal cyanide, cyanate, or thiocyanate of Example 8 as the anode active material have the improved cycle characteristics, compared with the prior art metal oxides.

EXAMPLE 9

The electrode characteristics of various metal and semi-metal tungstates specified in Table 31 and used as the anode active material were evaluated in Example 9.

Table 31 shows the discharge capacities of the test cells and the capacity maintenance rates of the cylindrical batteries at the 100-th cycle measured under the same conditions as those of Example 1.

TABLE 31

| Salt | Discharge capacity (mAh/g) | Capacity maintenance rate (%) |
|---|---|---|
| $Al_2(WO_4)_3$ | 292 | 86 |
| $AlWO_4$ | 301 | 83 |
| $SnWO_4$ | 477 | 94 |
| $Sn_2W_3O_8$ | 436 | 95 |
| $Sn(WO_4)_2$ | 402 | 96 |
| $Si(WO_4)_2$ | 282 | 95 |
| $PbWO_4$ | 405 | 95 |
| $PbWO_3$ | 419 | 94 |
| $CdWO_4$ | 326 | 91 |
| $CdWO_3$ | 345 | 90 |
| $Bi_2WO_6$ | 382 | 90 |
| $Bi_2(WO_4)_3$ | 368 | 92 |
| $In_2(WO_4)_3$ | 426 | 90 |
| $In(WO_3)_3$ | 398 | 94 |
| $Sb_2(WO_4)_3$ | 350 | 90 |
| $ZnWO_4$ | 208 | 86 |
| $ZnWO_3$ | 226 | 89 |
| $Ga_2(WO_4)_3$ | 321 | 89 |
| $Ga_2(WO_3)_3$ | 333 | 88 |
| $Ge(WO_4)_2$ | 341 | 89 |
| $Ge(WO_3)_2$ | 353 | 86 |
| $MgWO_4$ | 301 | 87 |
| $MgWO_3$ | 313 | 86 |
| $CaWO_4$ | 301 | 87 |
| $CaWO_3$ | 313 | 86 |
| $SrWO_4$ | 301 | 87 |
| $SrWO_3$ | 313 | 86 |

After the conclusion of cathode polarization of the test cells in the tenth cycle, the test cells were decomposed. No deposit of metallic lithium was observed in any of the test cells of Example 9.

The batteries using the metal or semi-metal tungstate of Example 9 as the anode active material have the improved cycle characteristics, compared with the prior art metal oxides.

EXAMPLE 10

The electrode characteristics of various metal and semi-metal molybdates specified in Table 32 and used as the anode active material were evaluated in Example 10.

Table 32 shows the discharge capacities of the test cells and the capacity maintenance rates of the cylindrical batteries at the 100-th cycle measured under the same conditions as those of Example 1.

TABLE 32

| Salt | Discharge capacity (mAh/g) | Capacity maintenance rate (%) |
|---|---|---|
| $Al_2(MoO_4)_3$ | 302 | 87 |
| $SnMo_2O_8$ | 426 | 94 |
| $SnMoO_4$ | 472 | 92 |
| $SiMo_2O_8$ | 340 | 90 |
| $PbMoO_4$ | 456 | 94 |
| $CdMoO_4$ | 346 | 91 |
| $Bi_2(MoO_4)_3$ | 402 | 93 |
| $In_2(MoO_4)_3$ | 436 | 94 |
| $InMo_4O_6$ | 398 | 96 |
| $Sb_2(MoO_4)_3$ | 348 | 90 |
| $ZnMoO_4$ | 268 | 87 |
| $Ga_2(MoO_4)_3$ | 359 | 89 |
| $GeMoO_4$ | 371 | 90 |
| $MgMoO_4$ | 324 | 88 |
| $CaMoO_4$ | 324 | 88 |
| $SrMoO_4$ | 324 | 88 |

After the conclusion of cathode polarization of the test cells in the tenth cycle, the test cells were decomposed. No deposit of metallic lithium was observed in any of the test cells of Example 10.

The batteries using the metal or semi-metal molybdate of Example 10 as the anode active material have the improved cycle characteristics, compared with the prior art metal oxides.

EXAMPLE 11

The electrode characteristics of various metal and semi-metal titanates specified in Table 33 and used as the anode active material were evaluated in Example 11.

Table 33 shows the discharge capacities of the test cells and the capacity maintenance rates of the cylindrical batteries at the 100-th cycle measured under the same conditions as those of Example 1.

TABLE 33

| Salt | Discharge capacity (mAh/g) | Capacity maintenance rate (%) |
|---|---|---|
| $AlTiO_5$ | 326 | 73 |
| $SnTiO_4$ | 443 | 82 |
| $SiTiO_6$ | 321 | 75 |
| $PbTiO_3$ | 476 | 80 |
| $PbTi_3O_7$ | 402 | 81 |
| $CdTiO_3$ | 354 | 76 |
| $Bi_2TiO_5$ | 498 | 81 |
| $Bi_2Ti_2O_7$ | 424 | 82 |
| $In_2TiO_5$ | 478 | 83 |
| $Sb_3Ti_2O_{10}$ | 369 | 80 |
| $ZnTiO_3$ | 324 | 76 |
| $GaTiO_5$ | 371 | 75 |
| $GeTiO_3$ | 380 | 74 |
| $MgTiO_4$ | 334 | 71 |
| $CaTiO_4$ | 334 | 71 |
| $SrTiO_4$ | 334 | 71 |

After the conclusion of cathode polarization of the test cells in the tenth cycle, the test cells were decomposed. No deposit of metallic lithium was observed in any of the test cells of Example 11.

The batteries using the metal or semi-metal titanate of Example 11 as the anode active material have the improved cycle characteristics, compared with the prior art metal oxides.

EXAMPLE 12

The electrode characteristics of various metal and semi-metal zirconates specified in Table 34 and used as the anode active material were evaluated in Example 12.

Table 34 shows the discharge capacities of the test cells and the capacity maintenance rates of the cylindrical batteries at the 100-th cycle measured under the same conditions as those of Example 1.

TABLE 34

| Salt | Discharge capacity (mAh/g) | Capacity maintenance rate (%) |
|---|---|---|
| $Al_2(ZrO_3)_3$ | 304 | 71 |
| $SnZrO_3$ | 484 | 78 |
| $SiZrO_4$ | 342 | 76 |
| $PbZrO_3$ | 466 | 77 |
| $CdZrO_3$ | 357 | 71 |
| $Bi_2(ZrO_3)_3$ | 419 | 77 |
| $In_2(ZrO_3)_3$ | 443 | 78 |
| $Sb_2(ZrO_3)_3$ | 354 | 75 |
| $ZnZrO_3$ | 294 | 73 |
| $Ga_2(ZrO_3)_3$ | 372 | 74 |
| $GeZrO_3$ | 379 | 72 |
| $MgZrO_3$ | 339 | 73 |
| $CaZrO_3$ | 339 | 73 |
| $SrZrO_3$ | 339 | 73 |

After the conclusion of cathode polarization of the test cells in the tenth cycle, the test cells were decomposed. No deposit of metallic lithium was observed in any of the test cells of Example 12.

The batteries using the metal or semi-metal zirconate of Example 12 as the anode active material have the improved cycle characteristics, compared with the prior art metal oxides.

EXAMPLE 13

The electrode characteristics of various metal and semi-metal vanadates specified in Table 35 and used as the anode active material were evaluated in Example 13.

Table 35 shows the discharge capacities of the test cells and the capacity maintenance rates of the cylindrical batteries at the 100-th cycle measured under the same conditions as those of Example 1.

TABLE 35

| Salt | Discharge capacity (mAh/g) | Capacity maintenance rate (%) |
|---|---|---|
| $AlVO_4$ | 319 | 82 |
| $SnV_2O_6$ | 452 | 89 |
| $Sn_2V_2O_6$ | 489 | 87 |
| $SiV_2O_7$ | 324 | 84 |
| $Pb_2V_2O_6$ | 477 | 86 |
| $PbV_2O_6$ | 427 | 88 |
| $CdV_2O_6$ | 326 | 83 |
| $BiVO_4$ | 436 | 86 |
| $Bi_2VO_5$ | 496 | 85 |
| $InVO_4$ | 498 | 85 |
| $In_2VO_5$ | 504 | 83 |
| $SbVO_4$ | 354 | 83 |
| $ZnV_2O_6$ | 311 | 81 |
| $GaVO_4$ | 368 | 83 |
| $GeV_2O_6$ | 341 | 84 |
| $MgV_2O_6$ | 312 | 79 |
| $CaV_2O_6$ | 312 | 79 |
| $SrV_2O_6$ | 312 | 79 |

After the conclusion of cathode polarization of the test cells in the tenth cycle, the test cells were decomposed. No deposit of metallic lithium was observed in any of the test cells of Example 13.

The batteries using the metal or semi-metal vanadate of Example 13 as the anode active material have the improved cycle characteristics, compared with the prior art metal oxides.

EXAMPLE 14

The electrode characteristics of various metal and semi-metal chromates specified in Table 36 and used as the anode active material were evaluated in Example 14.

Table 36 shows the discharge capacities of the test cells and the capacity maintenance rates of the cylindrical batteries at the 100-th cycle measured under the same conditions as those of Example 1.

TABLE 36

| Salt | Discharge capacity (mAh/g) | Capacity maintenance rate (%) |
|---|---|---|
| $AlCrO_3$ | 342 | 87 |
| $SnCrO_4$ | 463 | 94 |
| $Sn_2CrO_6$ | 504 | 92 |
| $Si(CrO_4)_2$ | 341 | 89 |
| $Pb_3CrO_6$ | 511 | 91 |
| $PbCrO_4$ | 484 | 93 |
| $CdCr_2O_4$ | 324 | 87 |
| $BiCrO_3$ | 432 | 91 |
| $Bi_2CrO_6$ | 426 | 93 |
| $InCrO_3$ | 445 | 92 |
| $In_2CrO_6$ | 486 | 90 |
| $Sb_2(CrO_4)_3$ | 352 | 88 |
| $ZnCrO_4$ | 336 | 87 |
| $Ga_3(CrO_4)_2$ | 381 | 86 |
| $GeCrO_4$ | 382 | 85 |
| $MgCr_2O_7$ | 304 | 87 |
| $CaCr_2O_7$ | 304 | 87 |
| $SrCr_2O_7$ | 304 | 87 |

After the conclusion of cathode polarization of the test cells in the tenth cycle, the test cells were decomposed. No deposit of metallic lithium was observed in any of the test cells of Example 14.

The batteries using the metal or semi-metal chromate of Example 14 as the anode active material have the improved cycle characteristics, compared with the prior art metal oxides.

EXAMPLE 15

The electrode characteristics of various metal and semi-metal niobates specified in Table 37 and used as the anode active material were evaluated in Example 15.

Table 37 shows the discharge capacities of the test cells and the capacity maintenance rates of the cylindrical batteries at the 100-th cycle measured under the same conditions as those of Example 1.

TABLE 37

| Salt | Discharge capacity (mAh/g) | Capacity maintenance rate (%) |
|---|---|---|
| $AlNbO_4$ | 324 | 71 |
| $SnNb_2O_6$ | 424 | 75 |
| $Sn_2Nb_2O_7$ | 468 | 74 |
| $SiNbO_4$ | 342 | 71 |
| $PbNb_2O_6$ | 403 | 74 |
| $Pb_2Nb_2O_7$ | 426 | 72 |
| $Cd_2Nb_2O_7$ | 314 | 71 |
| $BiNbO_4$ | 415 | 73 |
| $InNbO_4$ | 445 | 74 |
| $SbNbO_4$ | 370 | 73 |
| $ZnNb_2O_6$ | 204 | 71 |
| $GaNbO_4$ | 364 | 72 |
| $GeNb_2O_6$ | 368 | 73 |
| $MgNb_2O_6$ | 301 | 72 |

TABLE 37-continued

| Salt | Discharge capacity (mAh/g) | Capacity maintenance rate (%) |
|---|---|---|
| $CaNb_2O_6$ | 301 | 72 |
| $SrNb_2O_6$ | 301 | 72 |

After the conclusion of cathode polarization of the test cells in the tenth cycle, the test cells were decomposed. No deposit of metallic lithium was observed in any of the test cells of Example 15.

The batteries using the metal or semi-metal niobate of Example 15 as the anode active material have the improved cycle characteristics, compared with the prior art metal oxides.

EXAMPLE 16

The electrode characteristics of various metal and semi-metal tantalates specified in Table 38 and used as the anode active material were evaluated in Example 16.

Table 38 shows the discharge capacities of the test cells and the capacity maintenance rates of the cylindrical batteries at the 100-th cycle measured under the same conditions as those of Example 1.

TABLE 38

| Salt | Discharge capacity (mAh/g) | Capacity maintenance rate (%) |
|---|---|---|
| $AlTaO_4$ | 302 | 81 |
| $Sn_2Ta_2O_7$ | 476 | 88 |
| $SiTa_2O_7$ | 272 | 82 |
| $Pb_2Ta_2O_7$ | 406 | 87 |
| $Cd_2Ta_2O_7$ | 314 | 84 |
| $BiTaO_4$ | 404 | 86 |
| $InTaO_4$ | 446 | 85 |
| $SbTaO_4$ | 364 | 85 |
| $Zn_2Ta_2O_7$ | 246 | 83 |
| $GaTaO_4$ | 356 | 81 |
| $Ge_2Ta_2O_7$ | 346 | 81 |
| $Mg_2Ta_2O_7$ | 304 | 79 |
| $Ca_2Ta_2O_7$ | 304 | 79 |
| $Sr_2Ta_2O_7$ | 304 | 79 |

After the conclusion of cathode polarization of the test cells in the tenth cycle, the test cells were decomposed. No deposit of metallic lithium was observed in any of the test cells of Example 16.

The batteries using the metal or semi-metal tantalate of Example 16 as the anode active material have the improved cycle characteristics, compared with the prior art metal oxides.

EXAMPLE 17

The electrode characteristics of various metal and semi-metal manganates specified in Table 39 and used as the anode active material were evaluated in Example 17.

Table 39 shows the discharge capacities of the test cells and the capacity maintenance rates of the cylindrical batteries at the 100-th cycle measured under the same conditions as those of Example 1.

TABLE 39

| Salt | Discharge capacity (mAh/g) | Capacity maintenance rate (%) |
|---|---|---|
| $Al_2MnO_6$ | 326 | 80 |
| $SnMnO_3$ | 486 | 89 |
| $SnMn_2O_4$ | 424 | 90 |
| $SiMnO_3$ | 314 | 81 |
| $PbMnO_3$ | 443 | 87 |
| $CdMnO_3$ | 369 | 82 |
| $Bi_2MnO_4$ | 424 | 84 |
| $Bi_2MnO_6$ | 412 | 86 |
| $In_2MnO_4$ | 461 | 84 |
| $In_2MnO_6$ | 452 | 84 |
| $Sb_2MnO_4$ | 392 | 83 |
| $Sb_2MnO_6$ | 376 | 84 |
| $ZnMnO_3$ | 314 | 81 |
| $Ga_2MnO_4$ | 386 | 81 |
| $GeMnO_3$ | 349 | 82 |
| $MgMnO_3$ | 326 | 78 |
| $CaMnO_3$ | 326 | 78 |
| $SrMnO_3$ | 326 | 78 |

After the conclusion of cathode polarization of the test cells in the tenth cycle, the test cells were decomposed. No deposit of metallic lithium was observed in any of the test cells of Example 17.

The batteries using the metal or semi-metal manganate of Example 17 as the anode active material have the improved cycle characteristics, compared with the prior art metal oxides.

Although all the above examples refer to the cylindrical batteries, the principle of the present invention is not restricted to this structure but may be applicable to secondary batteries of various types, such as coin-type, rectangular-type, and cylinder-type.

In the above examples, $LiMn_{1.8}Co_{0.2}O_4$ was used as the cathode active material. The similar effects can be exerted for a variety of other cathode active materials allowing reversible charge and discharge operations, such as $LiMn_2O_4$, $LiCoO_2$, $LiNiO_2$, and the like.

As discussed above, the present invention uses an anode of high capacity and excellent cycle life and thereby provides a non-aqueous electrolyte secondary battery that is free of a short circuit due to dendrite and has a higher energy density and a high reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising a cathode capable of being charged and discharged, a non-aqueous electrolyte, and an anode capable of being charged and discharged, said anode having an active material that comprises a salt of a metal or a semi-metal and a compound selected from the group consisting of oxo-acids, thiocyanic acid, cyanogen, and cyanic acid, wherein each said oxo-acid comprises an element selected from the group consisting of nitrogen, sulfur, carbon, boron, phosphorus, selenium, tellurium, tungsten, molybdenum, titanium, chromium, zirconium, niobium, tantalum, manganese, and vanadium, salts of said oxo-acids of phosphorus and boron being restricted to hydrogenphosphates and hydrogenborates.

2. The non-aqueous electrolyte secondary battery in accordance with claim 1, wherein said anode comprises a mixture of said active material, carbon material, and a binding agent.

3. The non-aqueous electrolyte secondary battery in accordance with claim 1, wherein said metal or semi-metal is at least one selected from the group consisting of Al, Sn, Si, Pb, Cd, Bi, In, Zn, Mg, Ge, Ga, Ca, Ba, Sr, B, Ir, Sb, Ti, V, Cr, Mn, Fe, Co, Ni, Cu, Mo, W, and Nb.

4. The non-aqueous electrolyte secondary battery in accordance with claim 1, wherein said metal salt or semi-metal salt of said oxo-acid of nitrogen is at least one selected from the group consisting of nitrates and nitrites.

5. The non-aqueous electrolyte secondary battery in accordance with claim 1, wherein said metal salt or semi-metal salt of said oxo-acid of sulfur is at least one selected from the group consisting of sulfates, sulfites, disulfates, peroxomonosulfates, peroxodisulfates, thiosulfates, dithionates, disulfites, thiosulfites, dithionites, and sulfoxylates.

6. The non-aqueous electrolyte secondary battery in accordance with claim 1, wherein said metal salt or semi-metal salt of said oxo-acid of phosphorus is at least one selected from the group consisting of monohydrogenphosphates, dihydrogenphosphates, phosphinates, and phosphonates.

7. The non-aqueous electrolyte secondary battery in accordance with claim 1, wherein said metal salt or semi-metal salt of said oxo-acid of boron is at least one selected from the group consisting of monohydrogenborates and dihydrogenborates.

8. The non-aqueous electrolyte secondary battery in accordance with claim 1, wherein said metal salt or semi-metal salt of said oxo-acid of selenium is at least one selected from the group consisting of selenates $M_2(SeO_4)_m$, selenites $M_2(SeO_3)_m$, $M_2(SeO_5)_m$, $M(HSeO_4)_m$, and $M(HSeO_3)_m$, where M denotes a metal or semi-metal having a valence m.

9. The non-aqueous electrolyte secondary battery in accordance with claim 1, wherein said metal salt or semi-metal salt of said oxo-acid of tellurium is at least one selected from the group consisting of $M_6(TeO_6)_m$, $M_2(TeO_4)_m$, $M_5(H_5TeO_6)$, $M_4(H_2TeO_6)_m$, $M_2(H_3TeO_6)_m$, and $M_2(H_4TeO_6)_m$, where M denotes a metal or semi-metal having a valence m.

10. A non-aqueous electrolyte secondary battery comprising a cathode capable of being charged and discharged, a non-aqueous electrolyte, and an anode capable of being charged and discharged, said anode having an active material that comprises a salt of a metal or a semi-metal and an oxo-acid of an element selected from the group consisting of nitrogen, sulfur, carbon, boron, phosphorus, selenium, and tellurium, salts of said oxo-acids of phosphorus and boron being restricted to hydrogenphosphates and hydrogenborates.

11. The non-aqueous electrolyte secondary battery in accordance with claim 10, wherein said metal or semi-metal is at least one selected from the group consisting of Al, Sn, Si, Pb, Cd, Bi, In, Zn, Mg, Ge, Ga, Ca, Ba, Sr, B, Ir, Sb, Ti, V, Cr, Mn, Fe, Co, Ni, Cu, Mo, W, and Nb.

12. A non-aqueous electrolyte secondary battery comprising a cathode capable of being charged and discharged, a non-aqueous electrolyte, and an anode capable of being charged and discharged, said anode having an active material that comprises a salt of a metal or a semi-metal and an oxo-acid of a transition element selected from the group consisting of tungsten, molybdenum, titanium, chromium, zirconium, niobium, tantalum, manganese, and vanadium.

13. The non-aqueous electrolyte secondary battery in accordance with claim 12, wherein said metal or semi-metal is at least one selected from the group consisting of Al, Sn, Si, Pb, Cd, Bi, In, Zn, Mg, Ge, Ga, Ca, Ba, Sr, B, Ir, Sb, Ti, V, Cr, Mn, Fe, Co, Ni, Cu, Mo, W, and Nb.

14. A non-aqueous electrolyte secondary battery comprising a cathode capable of being charged and discharged, a non-aqueous electrolyte, and an anode capable of being charged and discharged, said anode having an active material that comprises a salt of a metal or a semi-metal and an oxo-acid, wherein said metal or semi-metal is at least one selected from the group consisting of Sn and Si, wherein said oxo-acid comprises an element selected from the group consisting of sulfur, phosphorus and boron and wherein salts of said oxo-acids of phosphorus and boron are restricted to hydrogenphosphates and hydrogenborates.

* * * * *